(12) United States Patent
Kim et al.

(10) Patent No.: US 10,484,989 B2
(45) Date of Patent: Nov. 19, 2019

(54) METHOD AND APPARATUS FOR RECEIVING OR TRANSMITTING DATA

(71) Applicant: Electronics and Telecommunications Research Institute, Daejeon (KR)

(72) Inventors: Cheulsoon Kim, Daejeon (KR); Eunkyung Kim, Daejeon (KR); Gi Yoon Park, Daejeon (KR); Young Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/410,966

(22) Filed: Jan. 20, 2017

(65) Prior Publication Data

US 2017/0215188 A1    Jul. 27, 2017

(30) Foreign Application Priority Data

| | | |
|---|---|---|
| Jan. 22, 2016 | (KR) | 10-2016-0008086 |
| Apr. 5, 2016 | (KR) | 10-2016-0041938 |
| May 13, 2016 | (KR) | 10-2016-0059069 |
| Jul. 25, 2016 | (KR) | 10-2016-0093882 |
| Aug. 12, 2016 | (KR) | 10-2016-0103246 |
| Sep. 30, 2016 | (KR) | 10-2016-0126987 |

(Continued)

(51) Int. Cl.
*H04W 72/04*    (2009.01)
*H04L 5/00*    (2006.01)

(52) U.S. Cl.
CPC ....... *H04W 72/0446* (2013.01); *H04L 5/0044* (2013.01)

(58) Field of Classification Search
CPC ... H04L 1/1812; H04L 5/0044; H04L 5/0048; H04L 5/0053; H04L 5/0055;
(Continued)

(56) References Cited

U.S. PATENT DOCUMENTS

| | | | |
|---|---|---|---|
| 8,457,032 B2 | 6/2013 | Suo et al. | |
| 2006/0291430 A1* | 12/2006 | Putzolu | H04W 28/20 370/335 |

(Continued)

FOREIGN PATENT DOCUMENTS

KR    10-2014-0008379    1/2014

OTHER PUBLICATIONS

"Discussion on the slot structure in time domain", 3GPP TSG RAN WG1 Meeting #86bis, R1-1609393, ETRI, Oct. 10-14, 2016, Lisbon, Portugal, pp. 1-4.

(Continued)

*Primary Examiner* — Khoa Huynh
(74) *Attorney, Agent, or Firm* — Staas & Halsey LLP

(57) ABSTRACT

A base station divides a subframe into a downlink time duration for downlink, an uplink time duration for uplink, and a guard period between the downlink time duration and the uplink time duration. The base station transmits a downlink control channel including information on a downlink packet duration allocated for downlink transmission of a terminal and information on an uplink packet duration allocated for uplink transmission of the terminal to the terminal in the downlink time duration.

8 Claims, 35 Drawing Sheets

(30) Foreign Application Priority Data

Nov. 4, 2016 (KR) ........................ 10-2016-0147020
Jan. 5, 2017 (KR) ........................ 10-2017-0002019

(58) Field of Classification Search
CPC .... H04L 72/044; H04W 28/26; H04W 72/04; H04W 72/0406; H04W 72/0413; H04W 72/042; H04W 72/0446; H04W 72/1278; H04W 72/1284; H04W 72/1289; H04W 72/1294; H04W 72/14
See application file for complete search history.

(56) References Cited

U.S. PATENT DOCUMENTS

| | | |
|---|---|---|
| 2013/0064146 A1 | 3/2013 | Ahn et al. |
| 2014/0044084 A1 | 2/2014 | Lee |
| 2015/0043392 A1 | 2/2015 | Susitaival et al. |
| 2015/0201431 A1 | 7/2015 | Um et al. |
| 2016/0080133 A1* | 3/2016 | Golitschek Edler von Elbwart ............ H04W 72/0446 370/280 |
| 2016/0270070 A1* | 9/2016 | Mukkavilli ....... H04W 72/0446 |
| 2017/0085346 A1* | 3/2017 | Tiirola .................. H04W 28/26 |
| 2017/0111160 A1* | 4/2017 | Chen ..................... H04L 1/1812 |

OTHER PUBLICATIONS

"Frame structure for new radio interface", 3GPP TSG RAN WG1 Meeting #86, R1-166942, ETRI, Aug. 22-26, 2016, Gothenburg, Sweden, pp. 1-2.

"Frame structure for new radio interface", 3GPP TSG RAN WG1 Meeting #85, R1-164871, ETRI, May 23-27, 2016, Nanjing, China, pp. 1-3.

* cited by examiner

METHOD AND APPARATUS FOR RECEIVING OR TRANSMITTING DATA

CROSS-REFERENCE TO RELATED APPLICATION

This application claims priority to and the benefit of Korean Patent Applications Nos. 10-2016-0008086, 10-2016-0041938, 10-2016-0059069, 10-2016-0093882, 10-2016-0103246, 10-2016-0126987, 10-2016-0147020, and 10-2017-0002019 filed in the Korean Intellectual Property Office on 22 Jan. 2016, 5 Apr. 2016, 13 May 2016, 25 Jul. 2016, 12 Aug. 2016, 30 Sep. 2016, 4 Nov. 2016, and 5 Jan. 2017, respectively, the entire contents of which are incorporated herein by reference.

BACKGROUND (a) Field

The present invention generally relates to a method and apparatus for transmitting or receiving data.

(b) Description of the Related Art

Among wireless communication schemes, frequency division duplexing (FDD) uses continuous frequency resources, i.e., continuous spectrums, among wireless resources. For example, spectrum 1 may be set as a downlink resource transmitted by a base station and received by a mobile station, and spectrum 2 may be set as an uplink resource transmitted by a mobile station and received by a base station. In this case, the same radio frame is repeated in each spectrum. One radio frame includes a plurality of sub-frames, and the sub-frame may be a minimum unit in time for scheduling. The FDD scheme requires at least two spectrums, i.e., a paired spectrum, and cannot be applied when only one spectrum, i.e., an unpaired spectrum, is used.

Time division duplexing (TDD) is a scheme in which transmission and reception of the base station and the terminal are mixed in one spectrum. One subframe may be a downlink subframe for transmission by the base station or an uplink subframe for transmission by the terminal. Such a TDD scheme may form different radio frames according to the order and combination of the downlink subframes and uplink subframes. Since the TDD scheme can allocate the spectrum as one unit, it can be applied not only to the unpaired spectrum but also to the paired spectrum.

In a case of the unpaired spectrum, retransmission, for example a hybrid automatic repeat request (HARQ) procedure, may be complicated. In the TDD scheme, there is a case where the downlink subframe does not correspond one-to-one with the uplink subframe. In this case, the many-to-one correspondence relationship should be defined in advance. In the case of the TDD scheme in which the number of downlink subframes is more than the number of uplink subframe, one uplink subframe transmits HARQ ACKs for several downlink subframes. In the case of the TDD scheme in which the number of uplink subframes is more than the number of downlink subframe, one downlink subframe transmits HARQ ACKs for several uplink subframes.

Therefore, the base station should wait for a specific uplink subframe including the HARQ ACK to confirm whether the terminal decodes the message transmitted by the base station. The terminal also should wait for a specific downlink subframe including the HARQ ACK in the uplink HARQ. This affects the latency of wireless communications and is therefore not suitable for a service for transmitting messages in a particularly short time.

SUMMARY

An embodiment of the present invention provides a method and apparatus for transmitting and receiving data applicable to a wireless communication system capable of operating in an unpaired spectrum.

According to an embodiment of the present invention, a method of transmitting or receiving data by a terminal in a wireless communication system using a radio frame including a plurality of subframes is provided. The method includes receiving a downlink control channel from a base station in a downlink time duration of a first subframe and receiving a downlink packet in the downlink packet duration from the base station. The first subframe is divided into the downlink time duration for downlink, an uplink time duration for uplink, and a guard period between the downlink time duration and the uplink time duration. The downlink control channel includes information on a downlink packet duration allocated for downlink transmission of the terminal and information on an uplink packet duration allocated for uplink transmission of the terminal.

The downlink control channel may further include a timing for transmitting an ACK/NACK feedback for the downlink packet by the terminal.

The timing may indicate a k-th subframe from the first subframe. Here, k is an integer equal to or greater than one.

The method may further include receiving information on a set of downlink packet durations and a set of uplink packet durations from the base station through a higher layer signaling. The information on the downlink packet duration may indicate an element of the set of downlink packet durations, and the information on the uplink packet duration may indicate an element of the set of uplink packet durations.

The information on the downlink packet duration may include a number of symbols included in the downlink packet duration and a start symbol index offset of the downlink packet duration.

The information on the uplink packet duration may include a number of symbols included in the uplink packet duration and a value indicating a transmission timing for the uplink packet duration.

The value may include a symbol index offset to be applied to a timing advance assigned to the terminal.

The information on the downlink packet duration may include an index of the downlink packet duration and a length of the downlink packet duration, and the information on the uplink packet duration may include an index of the uplink packet duration to be applied to a timing advance assigned to the terminal and a length of the uplink packet duration.

The downlink control channel may be transmitted at a beginning of the first subframe, and the method may further include receiving a second downlink control channel including additional information on the downlink packet duration or the uplink packet duration on a predetermined symbol of the downlink time duration.

The method may further include receiving a third downlink control channel including information on a length of the downlink time duration of the first subframe from the base station, and monitoring the downlink control channel or the second downlink control channel within the downlink time duration of the first subframe in a case of monitoring the downlink control channel or the second downlink control channel.

A downlink packet duration for downlink transmission of another terminal or an uplink packet duration for uplink transmission of another terminal may be allocated to the guard period.

A second subframe adjacent to the first subframe may include a second downlink time duration for downlink and a second uplink time duration for uplink in different order from the first subframe.

According to another embodiment of the present invention, a method of transmitting or receiving data by a base station in a wireless communication system using a radio frame including a plurality of subframes is provided. The method includes dividing a subframe into a downlink time duration for downlink, an uplink time duration for uplink, and a guard period between the downlink time duration and the uplink time duration, and transmitting to the terminal a downlink control channel including information on a downlink packet duration allocated for downlink transmission of a terminal and information on an uplink packet duration allocated for uplink transmission of the terminal in the downlink time duration.

According to yet another embodiment of the present invention, an apparatus for transmitting or receiving data in a wireless communication system using a radio frame including a plurality of subframes is provided. The apparatus includes a receiver, a transmitter, and a controller. The receiver receives a downlink control channel from a base station in a downlink time duration of a subframe. The subframe is divided into the downlink time duration for downlink, an uplink time duration for uplink, and a guard period between the downlink time duration and the uplink time duration. The downlink control channel includes information on a downlink packet duration allocated for downlink transmission of the apparatus and information on an uplink packet duration allocated for uplink transmission of the apparatus. The transmitter transmits an uplink packet in the uplink packet duration to the base station. The controller controls the receiver and the transmitter.

According to still another embodiment of the present invention, an apparatus for transmitting or receiving data in a wireless communication system using a radio frame including a plurality of subframes is provided. The apparatus includes a processor and a transmitter. The processor divides a subframe into a downlink time duration for downlink, an uplink time duration for uplink, and a guard period between the downlink time duration and the uplink time duration. The transmitter transmits to the terminal a downlink control channel including information on a downlink packet duration allocated for downlink transmission of a terminal and information on an uplink packet duration allocated for uplink transmission of the terminal to in the downlink time duration.

DETAILED DESCRIPTION OF THE EMBODIMENTS

Figure 1:
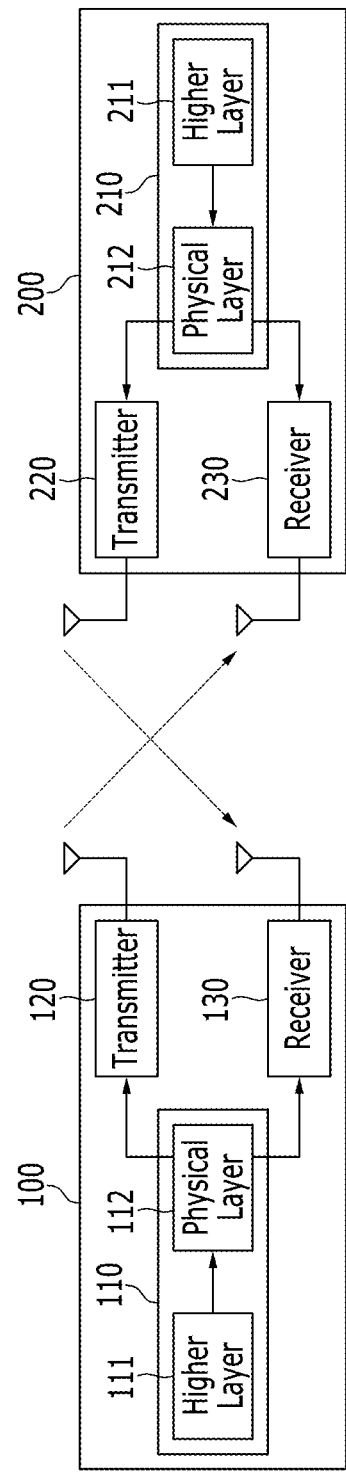
FIG. 1 schematically shows a wireless communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a term "terminal" may designate a user equipment (UE), a mobile station (MS), a mobile terminal (MT), an advanced mobile station (AMS), a high reliability mobile station (HR-MS), a subscriber station (SS), a portable subscriber station (PSS), an access terminal (AT), and so on, or may include all or some functions thereof.

Further, a term "base station" (BS) may designate a node B, an evolved node B (eNB), a gNB, an advanced base station (ABS), a high reliability base station (HR-BS), an access point (AP), a radio access station (RAS), a base transceiver station (BTS), an mobile multihop relay (MMR) BS, a relay station (RS) functioning as the BS, a relay node (RN) functioning as the BS, a high reliability relay station (HR-RS) functioning as the BS, a small BS [e.g., a femto BS, a pico BS, a macro BS, a micro BS, a home node B (HNB), a home eNB (HeNB), a home gNB (HgNB)], and so on, or may include all or some functions thereof.

FIG. 1 schematically shows a wireless communication system according to an embodiment of the present invention.

Referring to FIG. 1, a wireless communication system includes a plurality of base stations 100 and a plurality of terminals 200.

The base station 100 transmits a synchronization signal and a reference signal, and the terminal 200 recovers the message transmitted by the base station 100 using the synchronization signal and the reference signal received from the base station 100. The terminal 200 also transmits a synchronization signal and a reference signal, and the base station 100 recovers a message transmitted by the terminal 200 using the synchronization signal and the reference signal received from the terminal 200. The base station 100 may define a control channel for efficiently managing the plurality of terminals 200 and indicate radio resources to be used for transmission and reception of the terminals 200 through the control channel.

The base station 100 includes a processor 110, a transmitter 120, and a receiver 130. The processor 110 implements a higher layer 111 and a physical layer 112, and may execute commands necessary for operations of the base station 100 to be described below and control operations of the transmitter 120 and the receiver 130. The transmitter 120 transmits a signal delivered from the physical layer 112 to the terminal 200 via an antenna. The receiver 130 receives a signal from the terminal 200 via an antenna and transfers the signal to the physical layer 112. The transmitter 120 and the receiver 130 may exchange signals with other base stations 100.

Similarly, the terminal 200 includes a processor 210, a transmitter 220, and a receiver 230. The processor 210 implements a higher layer 211 and a physical layer 212, and may execute commands necessary for operations of the terminal 200 to be described below and control operations of the transmitter 120 and the receiver 130. The transmitter 220 transmits a signal delivered from the physical layer 212 to the base station 100 via an antenna. The receiver 230 receives a signal from the terminal 100 via an antenna and transfers the signal to the physical layer 212. The transmitter 220 and the receiver 230 may exchange signals with other terminals 200.

In some embodiments, another device 300 for managing the plurality of base stations 100 may be provided. The device 300 may manage radio resources such that the radio resources do not collide with each other among the plurality of base stations 100.

Next, a radio frame used in a wireless communication system according to an embodiment of the present invention is described with reference to FIG. 2.

Figure 2:
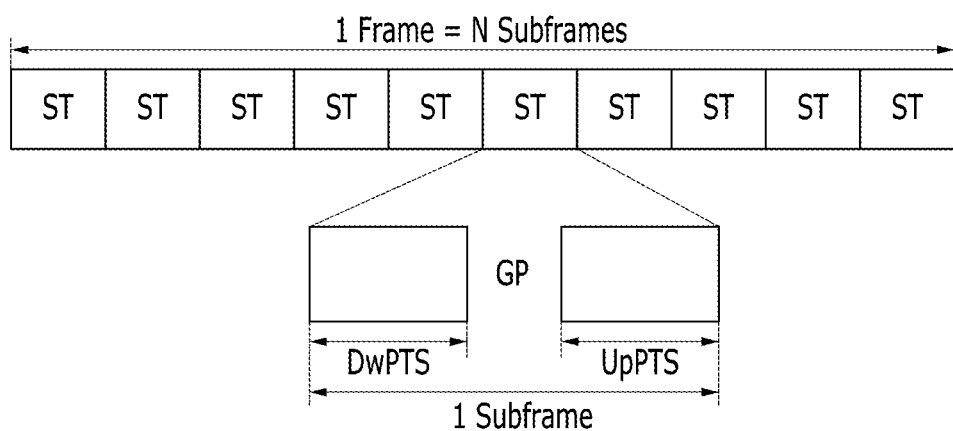
FIG. 2 shows a radio frame structure according to an embodiment of the present invention.

FIG. 2 shows a radio frame structure according to an embodiment of the present invention.

Referring to FIG. 2, a radio frame includes a plurality of subframes. A subframe may be referred to as a slot. According to an embodiment of the present invention, a certain subframe among the plurality of subframes is divided into a downlink and an uplink in time resources. Hereinafter, such a subframe is referred to as an "ST subframe."

The ST subframe includes a downlink time duration DwPTS and an uplink time duration UpPTS. The ST subframe further includes a guard period (GP) between the downlink time duration DwPTS and the uplink time duration UpPTS. The downlink time duration consists of consecutive transmission of downlink symbols, and the uplink time duration consists of consecutive transmission of uplink symbols. The guard period GP may be set in consideration of a propagation delay and a delay spread.

In some embodiments, the downlink symbol and the uplink symbol may refer to a symbol based on multi-carrier modulation. The numerology applied to multi-carrier modulation may be one or several (e.g., 15 kHz, 30 kHz). If multiple numerologies coexist on a single system carrier, the length of the guard period GP may vary depending on numerologies because a symbol length may vary.

A downlink control channel is transmitted in the downlink time duration. In some embodiments, the downlink control channel may be transmitted periodically. For example, the downlink control channel may be transmitted for each ST subframe or for each slot. Downlink data scheduling or uplink data scheduling may be performed through the downlink control channel.

A downlink packet may be transmitted during a downlink packet duration allocated to a terminal in the downlink time duration, and an uplink packet may be transmitted during an uplink packet duration allocated to the terminal in the uplink time duration. The downlink packet duration may be called a downlink sub-slot or a downlink transmission time interval (TTI), and the uplink packet duration may be called an uplink sub-slot or an uplink TTI. The sub-slot may also be referred to as a mini-slot.

In one embodiment, an aperiodic downlink control channel may be further transmitted between the periodically transmitted downlink control channels. Furthermore, the periodic downlink control channel and the aperiodic downlink control channel may independently perform the downlink data scheduling or the uplink data scheduling. Alternatively, the downlink data scheduling or the uplink data scheduling may be performed only when both the periodic downlink control channel and the aperiodic downlink control channel are received.

In some embodiments, an ST subframe having uplink symbols and downlink symbols in a different order from the ST subframe shown in FIG. 2 may be defined. Such an ST subframe is referred to as a "reverse subframe." In this case, an interval between the uplink time duration and the downlink time duration may be determined in consideration of a circuit switching delay. As described above, an ST subframe in which a downlink time duration precedes an uplink time duration is referred to as a "forward subframe."

The ST subframe may be variously set according to the number of downlink symbols and the number of uplink symbols. An ST subframe set consisting of possible combinations of ST subframes may be defined. Assuming that the number of cases for the number of downlink symbols used in the ST subframe is ND and the number of cased for the number of uplink symbols is NU, the number of possible combinations of ST subframes is ND*NU. In some embodiments, if the downlink symbol is defined as several types and the uplink symbol is defined as several types, the number of possible combinations of ST subframes may be ND*NU multiplied by the number of symbol type combinations.

In one embodiment, a base station (100 in FIG. 1) may select a maximum number of downlink symbols and a maximum number of uplink symbols, and share the selected maximum number of downlink symbols and the maximum number of uplink symbols with adjacent base stations 100 through signaling. Accordingly, the base station 100 can potentially prevent interference between terminals (200 in FIG. 1) without interfering with other adjacent base stations 100. In another embodiment, a device (300 of FIG. 1) that manages a plurality of base stations 100 may determine the maximum number of downlink symbols and the maximum number of uplink symbols, and forwards them to the base stations 100 such that the base stations 100 can share the maximum number of downlink symbols and the maximum number of uplink symbols. In another embodiment, some base stations 100 among the plurality of base stations 100 may determine the maximum number of downlink symbols and the maximum number of uplink symbols, and may transmit them to the adjacent base stations 100. The base station 100 may determine the maximum number of downlink symbols and the maximum number of uplink symbols among the maximum number set of downlink symbols and the maximum number set of uplink symbols transmitted.

In some embodiments, the base station 100 may forward the ST subframe configuration to the terminal through a higher layer configuration, i.e., higher layer signaling. In another embodiment, the ST subframe configuration may be transmitted to the terminal 100 through dynamic scheduling, i.e., a downlink control channel.

The terminal 200 may support both low latency traffic and high latency traffic. The base station may use a radio frame including a plurality of ST subframes to support the low latency traffic. FIG. 2 shows a case where all ten subframes of the radio frame are ST subframes. However, the number of subframes included in the radio frame is not limited to this, and some of the subframes included in the radio frame may be downlink subframes or uplink subframes.

For example, if a radio frame includes a downlink subframe, an uplink subframe, and an ST subframe, the number of subframes necessary for receiving an HARQ feedback after the base station transmits downlink assignment may be different depending on a subframe index to which the downlink assignment belongs. For example, when the downlink assignment is transmitted on a downlink subframe, the HARQ feedback may be received on an uplink subframe following the downlink subframe or an uplink time duration of an ST subframe following the downlink subframe. However, when the downlink assignment is transmitted on an ST subframe, the HARQ feedback can be transmitted in the same ST subframe if the guard period is set to a time longer than the minimum time necessary for transmitting the HARQ feedback after receiving data.

The base station may adjust the downlink time duration and the uplink time duration in the ST subframe according to a ratio between the downlink traffic and the uplink traffic or the interference of neighboring devices. This may be performed in the higher layer of the base station.

Next, a method of scheduling an ST subframe to the mobile station by the base station is described with reference to FIG. 3 to FIG. 5.

Figure 3:
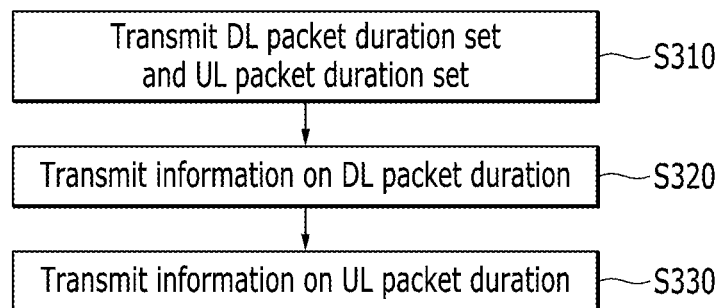
FIG. 3 is a flowchart showing a method of scheduling an ST subframe in a wireless communication system according to an embodiment of the present invention.

FIG. 3 is a flowchart showing a method of scheduling an ST subframe in a wireless communication system according to an embodiment of the present invention.

Referring to FIG. 3, in some embodiments, a base station transmits information on a set of downlink packet durations and a set of uplink packet durations to a terminal (S310). In one embodiment, the base station may transmit the information on the set of downlink packet durations and the set of uplink packet durations to the terminal through a higher layer configuration, i.e., higher layer signaling.

If the terminal does not receive the higher layer configuration from the base station in an initial access stage, the terminal may apply a downlink packet duration or a downlink packet duration and an uplink packet duration that are predefined in a standard and stored in the terminal in order to receive system information. After the terminal receives the higher layer configuration from the base station, the terminal can receive a packet by applying the corresponding configuration information.

When the information on the packet duration of the terminal is reconfigured through the higher layer configuration from the base station, the terminal may apply the downlink packet duration or the downlink packet duration and the uplink packet duration that are predefined in the standard and stored in the terminal In some embodiments, the set of downlink packet durations may include a set of downlink symbol numbers used by the downlink packet and a set of downlink symbol index offsets that start demodulating the downlink packet. The set of uplink packet durations may include a set of uplink symbol numbers used by the uplink packet and a set of uplink symbol index offsets of additional timing advance applied to the uplink packet.

In some embodiments, the set of downlink packet durations may include a set of indexes of the downlink packet duration, and the set of uplink packet durations may include a set of indexes of the uplink packet duration. In one embodiment, the set of downlink packet durations may further include a set of lengths of the downlink packet duration, and the set of uplink packet durations may further include a set of lengths of the uplink packet duration. In one embodiment, the downlink packet duration may correspond to a downlink sub-slot and the uplink packet duration may correspond to an uplink sub-slot. Alternatively, in a case where the subframe includes a plurality of slots, for example, two slots, the downlink packet duration may correspond to a downlink slot and the uplink packet duration may correspond to an uplink slot.

Referring to FIG. 3 again, the base station transmits information on a downlink packet duration selected from the set of downlink packet durations and information on an uplink packet duration selected from the set of uplink packet durations to the terminal (S320 and S330). The base station may transmit the information on the downlink packet duration through a downlink assignment of a downlink control channel (S320), and may transmit the information on the uplink packet duration through an uplink grant of the downlink control channel (S330). That is, the downlink control information (DCI) of the downlink control channel for downlink assignment may include the information on the downlink packet duration, and the DCI of the downlink control channel for the uplink grant may include the information on the uplink packet duration. The downlink control channel may be, for example, a physical downlink control channel (PDCCH).

In some embodiments, the base station may transmit to the terminal information indicating a downlink symbol number (the number of downlink symbols) selected from the set of downlink symbol numbers, a downlink symbol index offset selected from the set of downlink symbol index offsets, an uplink symbol number (the number of uplink symbols) selected from the set of uplink symbol numbers, and an uplink symbol index offset selected from the set of uplink symbol index offsets.

In one embodiment, the base station may transmit information indicating the selected downlink symbol number, information indicating the selected downlink symbol index offset, information indicating the selected uplink symbol number, and information indicating the selected uplink symbol index offset.

In another embodiment, the base station may define a plurality of ST subframes defined by various combinations of the downlink symbol number, the downlink symbol index offset, the uplink symbol number, and the uplink symbol index offset, and transmit information indicating an ST subframe selected from the plurality of ST subframes.

In yet another embodiment, the base station may define a plurality of downlink packet durations defined by various combinations of the downlink symbol number and the downlink symbol index offset, and transmit information for indicating a downlink packet duration selected from the plurality of downlink packet durations. The base station may define a plurality of uplink packet durations defined by various combinations of the uplink symbol number and the uplink symbol index offset, and transmit information indicating an uplink packet duration selected from the plurality of uplink packet durations.

In some embodiments, the base station may transmit to the terminal information indicating a downlink packet duration index selected from the set of downlink packet duration indexes and information indicating a length of the downlink packet duration, and transmit to the terminal information indicating an uplink packet duration index selected from the set of uplink packet duration indexes and information indicating a length of the uplink packet duration.

On the other hand, the set of downlink symbol numbers may have ND elements. For example, the downlink packet duration may have $TD_i$ downlink symbols among TD downlink symbols, and $TD_i$ corresponds to one element of $\{TD_1, TD_2, \ldots TD_{ND}\}$ set. Here, $TD_{ND}$ may be equal to TD, and $TD_1$ to $TD_{ND-1}$ may have a value smaller than TD.

In this case, the ND elements include one normal downlink packet duration and (ND−1) reduced downlink packet durations. Here, if ND is 1, only the normal downlink packet duration may be supported. The normal downlink packet duration occupies the TD downlink symbols which correspond to the downlink time duration. The reduced downlink packet duration occupies a smaller number of downlink symbols than the TD downlink symbols. In some embodiments, the reduced downlink packet duration may be used to decode the low latency downlink traffic and to secure processing time for generating an uplink HARQ feedback. The reduced downlink packet duration may be referred to as a short downlink TTI. In one embodiment, the reduced downlink packet duration may also be applied to high latency downlink traffic.

In some embodiments, the base station may generate another set of downlink symbol numbers with elements supported by the terminal from the $\{TD_1, TD_2, \ldots TD_{ND}\}$ set and inform the generated set to the terminal. When the terminal cannot support all the elements of the $\{TD_1, TD_2, \ldots TD_{ND}\}$ set depending on the processing capability of the terminal or it is not necessary to support unnecessary elements according to the communication service scenario, the base station may generate the set with only some elements.

In one embodiment, when one downlink packet duration is operated, the base station may not transmit the set of downlink symbol numbers to the terminal.

The set of uplink symbol numbers may have NU elements. For example, the uplink packet duration may have $TU_j$ uplink symbols among TU uplink symbols, and $TU_j$ corresponds to one element of $\{TU_1, TU_2, \ldots TU_{NU}\}$ set. Here, $TU_{NU}$ may be equal to TU, and $TU_1$ to $TU_{NU-1}$ may have a value smaller than TU.

In this case, the NU elements include one normal uplink packet duration and (NU−1) reduced uplink packet durations. Here, if NU is 1, only normal uplink packet duration may be supported. The normal uplink packet duration occupies the TU uplink symbols which correspond to the uplink time duration. The reduced uplink packet duration occupies a smaller number of uplink symbols than the TU uplink symbols.

In some embodiments, the base station may generate another set of uplink symbol numbers with elements supported by the terminal from the $\{TU_1, TU_2, \ldots TU_{NU}\}$ set and inform the generated set to the terminal. When the terminal cannot support all the elements of the $\{TU_1, TU_2, \ldots TU_{NU}\}$ set depending on the processing capability of the terminal or it is not necessary to support unnecessary elements according to the communication service scenario, the base station may generate the set with only some elements.

In one embodiment, when one uplink packet duration is operated, the base station may not transmit the set of uplink symbol numbers to the terminal.

In one embodiment, the terminal may set uplink transmission timing based on an uplink symbol index offset received through the uplink grant and timing advance received through a MAC control element. In one embodiment, the terminal may set a value obtained by subtracting the uplink symbol index offset from the timing advance to effective timing advance, and transmit the uplink packet in the effective timing advance.

On the other hand, a sum of the downlink symbol number TD and the uplink symbol number TU is smaller than a length of one subframe. In some embodiments, there may be a case where the base station does not need to allocate a downlink packet or an uplink packet to the terminal in one subframe.

In one embodiment, the base station may designate the uplink symbol number TU to zero and allocate only downlink packets. In this case, the downlink time duration may be the same as one subframe. If a guard period is required, the downlink time duration may be shorter than one subframe and the guard period may be allocated after the downlink time duration. This subframe may be referred to as a DL-centric subframe. In some embodiments, fixed downlink resources may be used. That is, the downlink resources may be defined such that the terminal can assume that the base station always assigns downlink control information or downlink data to some downlink symbols and some subcarriers belonging to a subframe.

In another embodiment, the base station may allocate TD downlink symbols only to downlink control information and a guard period with a predetermined length. Here, TD is greater than zero. The base station may allocate TU uplink symbols for uplink packets to a remaining part of the subframe. Such a subframe may be referred to as a UL-centric subframe.

Figure 4:
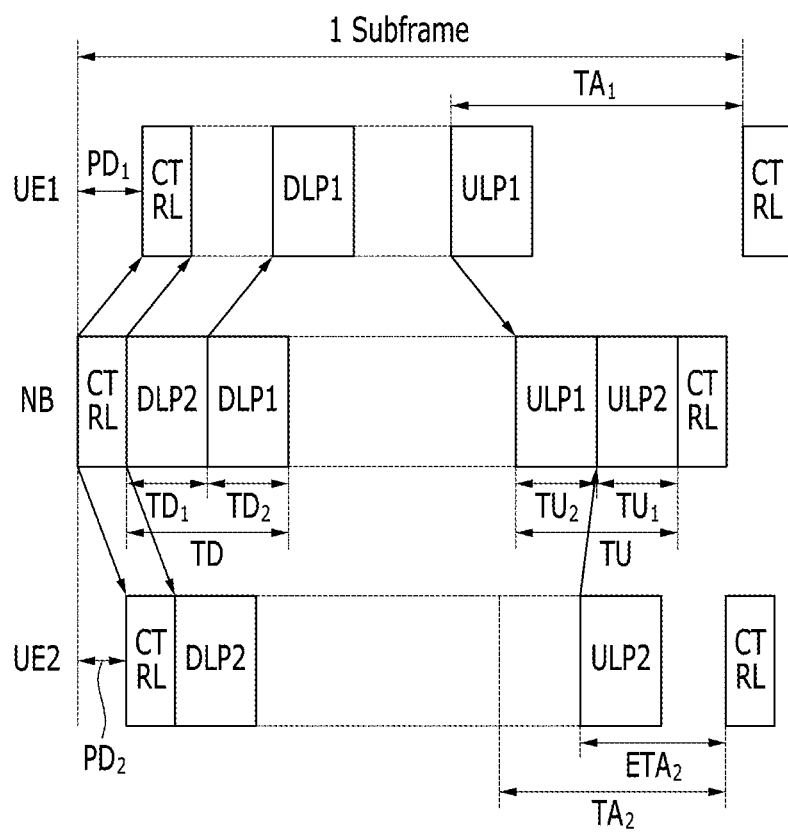
FIG. 4 shows a method for transmitting or receiving data using an ST subframe in a wireless communication system according to an embodiment of the present invention.

FIG. 4 shows a method for transmitting or receiving data using an ST subframe in a wireless communication system according to an embodiment of the present invention.

Referring to FIG. 4, it is assumed that a base station NB communicates with a plurality of terminals UE1 and UE2.

In FIG. 4, it is assumed that the terminal UE1 is assigned $TD_2$ as the number of downlink symbols, $TD_1$ as a downlink symbol index offset, $TU_2$ as the number of uplink symbols, and 0 as an uplink symbol index offset. It is assumed that the terminal UE2 is assigned $TD_1$ as the number of downlink symbols, 0 as a downlink symbol index offset, $TU_1$ as the number of uplink symbols, and $TU_2$ as an uplink symbol index offset. In some embodiments, each of the terminals UE1 and UE2 may know a downlink packet duration (for example, the number of downlink symbols occupied by a downlink packet and a downlink symbol index offset) and an uplink packet duration (the number of uplink symbols occupied by an uplink packet and an uplink symbol index offset) through downlink assignment and uplink grant. The terminals UE1 and UE2 may also know timing advances $TA_1$ and $TA_2$ through a MAC information element. In some embodiments, transmit powers used by the terminals UE1 UE2 may be detected from the downlink assignment.

Then, in order to receive a downlink packet transmitted by the base station NB, the terminal UE1 demodulates the downlink packet of $TD_2$ downlink symbols after the downlink symbol index offset $TD_1$ from the downlink control channel CTRL. At this time, the terminal UE1 may receive the downlink control channel CTRL after a propagation delay PD1 between the base station NB and the terminal UE1. Further, since the uplink symbol index offset is 0, the terminal UE1 transmits an uplink packet using $TU_2$ uplink symbols in accordance with the received timing advance $TA_1$.

In order to receive a downlink packet transmitted by the base station NB, the other terminal UE2 demodulates the downlink packet of $TD_1$ downlink symbol from a time point when the start symbol index offset is zero. That is, the terminal UE2 demodulates the downlink packet from the downlink symbols received consecutively after the downlink control channel CTRL. At this time, the terminal UE2 may receive the downlink control channel CTRL after a propagation delay PD2 between the base station NB and the terminal UE2. The terminal UE2 sets a value reflecting the uplink symbol index offset $TU_2$ to the received timing advance $TA_2$ to an effective timing advance $ETA_2$ and transmits an uplink packet in accordance with the effective timing advance $ETA_2$. At this time, the effective timing advance $ETA_2$ may be set to a value obtained by subtracting the uplink symbol index offset $TU_2$ from the received timing advance $TA_2$.

Although not shown in FIG. 4, TU ($=TU_1+TU_2$) uplink symbols may be allocated to other terminal. This terminal may transmit an uplink packet using TU uplink symbols in accordance with the timing advance.

Figure 5:
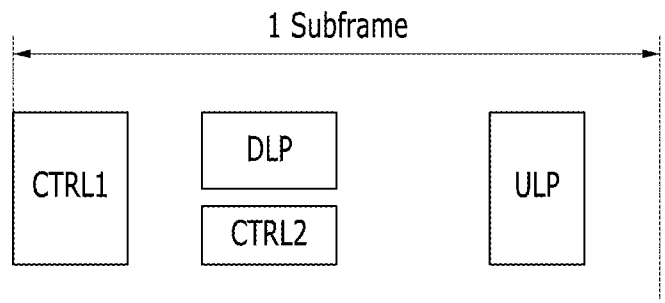
FIG. 5 is shows another method of transmitting a downlink control channel in a wireless communication system according to an embodiment of the present invention.

FIG. 5 is shows another method of transmitting a downlink control channel in a wireless communication system according to an embodiment of the present invention.

Referring to FIG. 5, in some embodiments, a downlink control channel CTRL2 may be transmitted in a predetermined set of symbol(s) in a subframe. This predetermined symbol may correspond to the beginning of a subframe or a downlink time duration. The base station may control a downlink packet DLP by transmitting downlink assignment or control an uplink packet ULP by transmitting uplink grant, through the downlink control channel CTRL2. In one embodiment, the downlink control channel CTRL2 may coexist with the downlink packet DLP in a time division multiplexing (TDM) scheme or a frequency division multiplexing (FDM) scheme.

In some embodiments, the base station may transmit a first downlink control channel CTRL1 at the beginning of the subframe and further transmit a second downlink control channel CTRL2 at a predetermined set of symbol(s) in the subframe. In one embodiment, the second downlink control channel CTRL2 may include downlink assignment or uplink grant in the same manner as the first downlink control channel CTRL1. Therefore, the base station may perform scheduling using only one of the first downlink control channel CTRL1 and the second downlink control channel CTRL2. In another embodiment, the first downlink control channel CTRL1 and the second downlink control channel CTRL2 may support step-wise scheduling. In this case, the terminal may demodulate downlink assignment or uplink grant information only when receiving both the first downlink control channel CTRL1 and the second downlink control channel CTRL2. For this, the first downlink control channel CTRL1 and the second downlink control channel CTRL2 may transmit different information. For example, the first downlink control channel CTRL1 may transfer a resource block assignment and an HARQ identifier (ID), and the second downlink control channel CTRL2 may transfer a modulation and coding scheme (MCS).

In some embodiments, the base station may indicate to the terminal through the first downlink control channel CTRL1 whether to perform a monitoring operation of the second downlink control channel CTRL2. At this time, the base station may indicate, in the terminal-specific manner, whether to perform the monitoring operation of the second downlink control channel CTRL2.

In some embodiments, the base station may transmit a third downlink control channel to the terminal every ST subframe or every slot. The third downlink control channel may be called a physical subframe type indication channel (PSTICH).

In one embodiment, the PSTICH may include information a length of a downlink time duration. The PSTICH may be transmitted as a cell-specific message such that the terminal in an idle state can receive the PSTICH. Accordingly, the terminal can monitor the first downlink control channel CTRL1 or the second downlink control channel CTRL2 within the downlink time duration identified by the PSTICH. Alternatively, upon receiving the PSTICH, the terminal may not receive the first downlink control channel CTRL1 and the second downlink control channel CTRL2. That is, after receiving the PSTICH, the terminal may determine whether to further receive the first or second downlink control channels CTRL1 and CTRL2. Then, the terminal can receive a downlink packet from the base station based on the downlink time duration indicated by the PSTICH.

In another embodiment, the PSTICH may indicate to the terminal whether to perform the monitoring operation of the first or second downlink control channel CTRL1 or CTRL2. The PSTICH may indicate a downlink symbol on which the first or second downlink control channel CTRL1 or CTRL2 is transmitted in the subframe. Accordingly, the terminal monitors the first downlink control channel CTRL1 or the second downlink control channel CTRL2 on the predetermined set of symbol(s). The base station may configure different terminals to monitor the first downlink control channel CTRL1 or the second downlink control channel CTRL2 on different symbols. As such, the base station can control the monitoring of the second downlink control channel CTRL2 through the transmission of the PSTICH, which can help battery management of the terminal.

In yet another embodiment, the terminal may receive the PSTICH of adjacent base station to recognize the subframe or slot type. The terminal may separate the CSI (channel estimation information) estimation with respect to the slot type of the adjacent base station. For example, the terminal may be configured to estimate K distinct CSI subframe set (or slot set) or CSI process. In other words, the terminal may distinguish K distinct interference hypotheses depending on combinations of the slot type of adjacent base stations. For example, three adjacent base stations operate the dynamic TDD and the terminal is configured to monitor 8 CSI subframe set or 8 CSI processes. The terminal may notice a specific subframe set or a specific CSI process by receiving the PSTICH of each adjacent base station.

An ST subframe configuration between different base stations is described with reference to FIG. 6 to FIG. 8.

Figure 6:
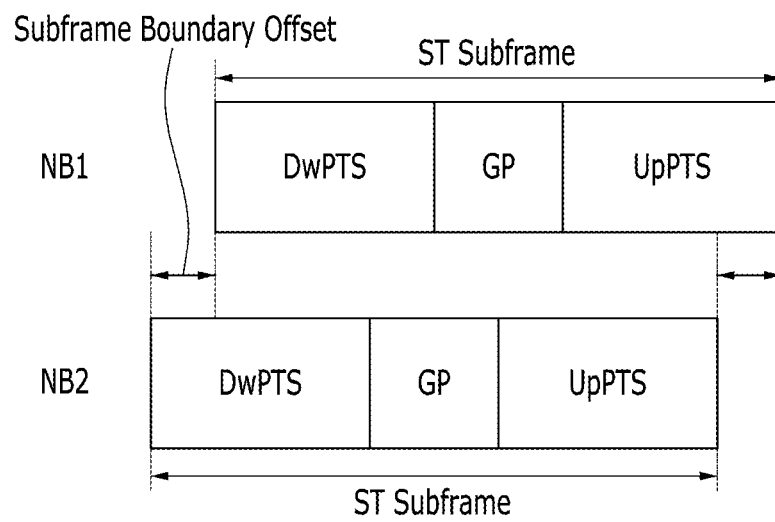
FIG. 6, FIG. 7, and FIG. 8 show an ST subframe configuration between base stations in a wireless communication system according to an embodiment of the present invention.
Figure 7:
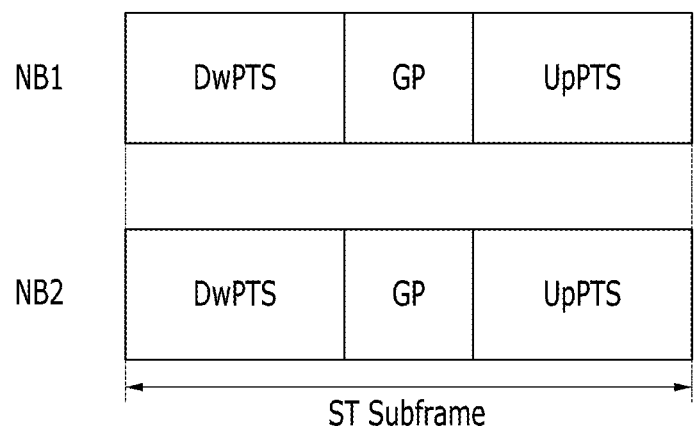
Figure 8:
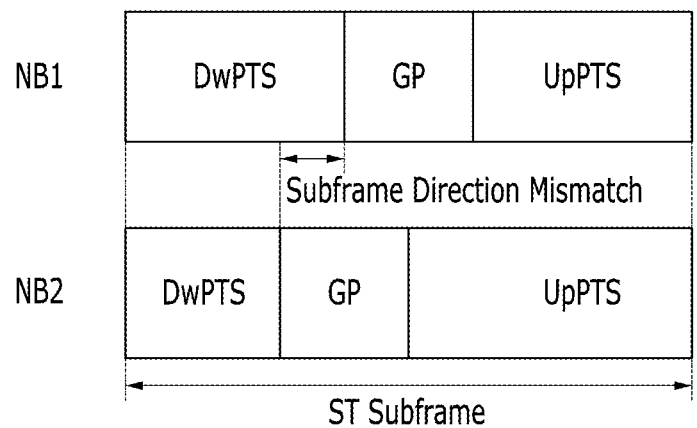

FIG. 6, FIG. 7, and FIG. 8 show an ST subframe configuration between base stations in a wireless communication system according to an embodiment of the present invention.

Referring to FIG. 6 and FIG. 7, in some embodiments, an ST subframe configuration may be set such that a downlink time duration DwPTS and an uplink time duration UpPTS do not overlap with each other between neighboring base stations NB1 and NB2, in order to reduce uplink and downlink interferences. For example, in a case where an uplink time duration UpPTS of the base station NB1 overlaps with a downlink time duration DwPTS of the base station NB2, an interference may occur because the base station NB1 can receive a downlink packet of the base station NB2 when receiving an uplink packet from the terminal in the uplink time duration UpPTS. Therefore, the interference can be prevented by configuring ST subframes so that the downlink time duration DwPTS and the uplink time duration UpPTS do not overlap with each other between the neighboring base stations NB1 and NB2.

In this case, as shown in FIG. 6, if subframe boundaries of the base stations NB1 and NB2 do not match with each other, an interference may occur. For example, when a subframe boundary offset occurs, a subframe of the base station NB1 may be an uplink time duration UpPTS and a subframe of the base station NB2 may be a downlink time duration DwPTS. Then, since the base station NB1 receives both an uplink packet of the terminal and a downlink packet of the base station NB2, a demodulation quality of the uplink packet from the terminal may deteriorate. Therefore, in another embodiment, as shown in FIG. 7, the subframe boundaries may be aligned between the ST subframes of the base stations NB1 and NB2.

Referring to FIG. 8, in some embodiments, base stations NB1 and NB2 may use different ST subframes. In this case, an interference may occur when the base station NB1 allocates a downlink time duration DwPTS for a long time and the base station NB2 allocates an uplink time duration UpPTS for a long time. That is, a timing when a terminal UE1 communicating with the base station NB1 receives a downlink packet from the base station NB1 may be a timing when a propagation delay and a delay spread have elapsed after the base station NB1 transmits the downlink packet. A timing when a terminal UE2 communicating with the base station NB2 transmits an uplink packet may be a timing when the base station NB2 instructs the timing advance. Therefore, when the two terminals UE1 and UE2 are adjacent to each other, a subframe direction mismatch may occurs such that the terminal UE1 can simultaneously receive the downlink packet of the base station NB1 and the uplink packet of the UE2. Consequently, a decoding performance of the downlink packet may deteriorate. In some embodiments, the neighboring base stations NB1 and NB2 may share a maximum propagation delay and a maximum timing advance and set a separate propagation delay and a separate timing advance for each of the terminals UE1 and UE2 such that the subframe direction mismatch can be avoided.

Next, a downlink transmission method using a radio frame according to an embodiment of the present invention is described with reference to FIG. 9 to FIG. 15.

FIG. 9, FIG. 10, FIG. 11, FIG. 12 and FIG. 13 each show a downlink transmission method in a wireless communication system according to an embodiment of the present invention.

Referring to FIG. 9, FIG. 10, FIG. 11 and FIG. 12, when a base station transmits a downlink packet DLP in a downlink time duration of an ST subframe to a terminal, a terminal may transmit an HARQ feedback in an uplink time duration of the same ST subframe. Hereinafter, the HARQ feedback for the downlink packet DLP is referred to as an "uplink HARQ feedback." The uplink HARQ feedback for each transport block may be an uplink HARQ ACK or an uplink HARQ NACK. For convenience, the uplink HARQ feedback is shown as an HARQ ACK in FIG. 9, FIG. 10, FIG. 11, and FIG. 12.

Figure 9:
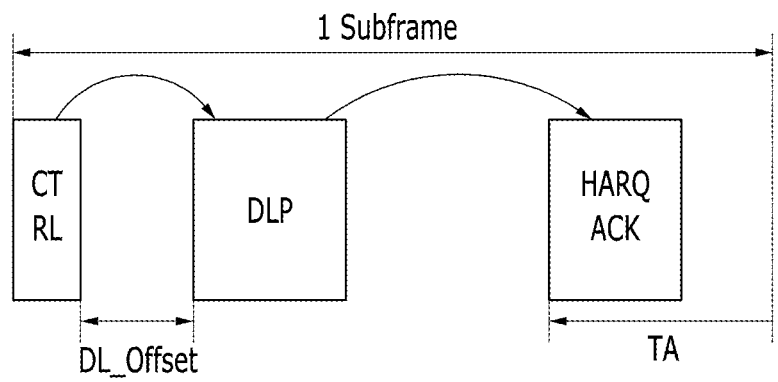
FIG. 9, FIG. 10, FIG. 11, FIG. 12 and FIG. 13 each show a downlink transmission method in a wireless communication system according to an embodiment of the present invention.
Figure 10:
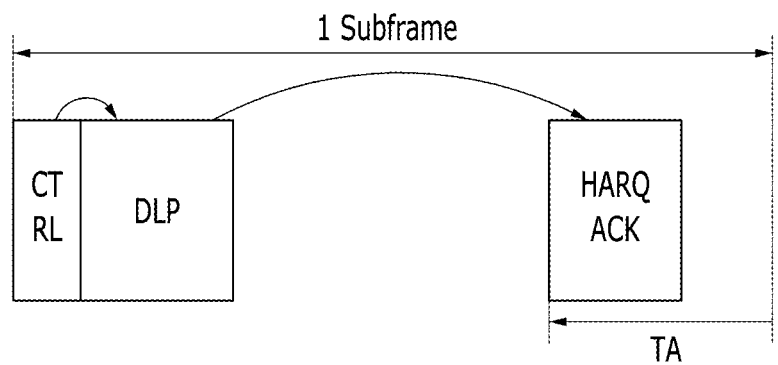
Figure 11:
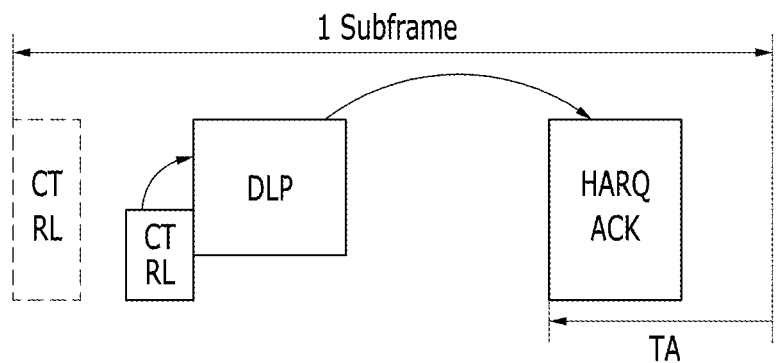

As shown in FIG. 9, FIG. 10, and FIG. 11, the base station may transmit a downlink control channel CTRL including a downlink assignment and an uplink grant to a terminal, and then transmits a downlink pack DLP after a downlink symbol index offset DL_Offset. The terminal UE may transmit an uplink HARQ feedback in accordance with an effective timing advance TA in the same ST subframe. FIG. 9 and FIG. 10 show a case where the downlink control channel CTRL including the downlink assignment and the uplink grant is transmitted through a beginning downlink symbol(s) of the ST subframe, and FIG. 11 shows a case where the downlink control channel CTRL is transmitted through a downlink symbol(s) which is in the middle of the ST subframe. Further, FIG. 9 shows a case where the downlink symbol index offset DL_Offset has a value larger than 0, and FIG. 10 and FIG. 11 show a case where the downlink symbol index offset is zero.

Figure 12:
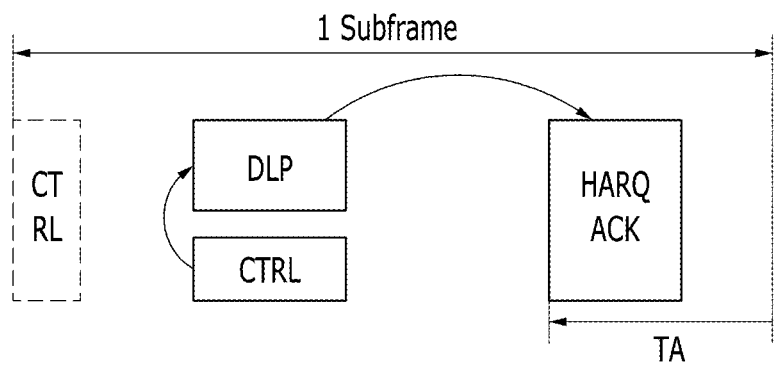

As shown in FIG. 12, the base station may transmit a downlink control channel CTRL and a downlink packet DLP in the same downlink symbol using different subcarriers to the terminal. The terminal may transmit an uplink HARQ feedback in accordance with an effective timing advance TA.

In some embodiments, a size of a downlink packet may be limited to a predetermined size or less in order to transmit an uplink HARQ feedback in the same ST subframe as the downlink packet. To this end, a base station may segment the downlink packet so that the size of each downlink packet is the predetermined size or less. Then, a time required for a terminal to decode the downlink packet can be reduced. In this case, the base station may allocate a radio resource corresponding to a small number of downlink symbols such that a short packet can be confined to a short time but a sufficient bandwidth, and schedule the radio resource to the terminal. In one embodiment, the number of downlink symbols to be applied to short packet scheduling may be configured through a higher layer signalling. In this case, the number of downlink symbols may be implicitly or explicitly indicated. For example, the number of downlink symbols may be implicitly indicated in a manner of the predetermined number of downlink symbols according to traffic types and explicitly indicating a specific traffic type, or the number of downlink symbols may be explicitly indicated. In another embodiment, the number of downlink symbols to be applied to the short packet scheduling may be included in the downlink assignment. Those set of downlink symbols may correspond to a downlink sub-slot.

It is possible to consider a case where different terminals support different traffic with different latency requirements in an environment where several terminals served by the base station exist. For example, a terminal UEL supporting low latency traffic may have a short downlink HARQ round trip time (RTT) and a short uplink HARQ RTT, and a longer HARQ RTT may be configured to a terminal UEH supporting high latency traffic. The terminals UEL and UEH may receive the low latency traffic or the high latency traffic via a downlink assignment.

In some embodiments, a base station may transmit uplink HARQ feedback transmission timing of a terminal through a downlink control channel, for example, a DCI of the downlink control channel, or a higher layer signalling, or a combination of a DCI of the downlink control channel and a higher layer signalling. The transmission timing of the UL HARQ feedback may be calculated from a time point when a downlink packet is received. A unit of the transmission timing may be an uplink symbol index, an uplink slot index, an uplink slot index, or an uplink subframe index. The terminal UEL may be instructed to transmit the uplink HARQ feedback in the same slot as the slot where the downlink packet is received.

In order to support the terminals UEL and UEH supporting the different traffics types in one ST subframe, a TDM scheme or a scheme in which both the TDM scheme or an FDM scheme are applied may be used.

The base station may decrease a time between downlink assignment transmission and downlink packet transmission, to minimize a time from when the terminal UEL receives the downlink assignment until it transmits the uplink HARQ feedback. To this end, as shown in FIG. 9, FIG. 10 or FIG. 11 when transmitting a downlink control channel CTRL including the downlink assignment and a downlink packet DLP in different downlink symbols, the base station may transmit the downlink packet DLP in succession to the downlink control channel CTRL. In another embodiment, the base station may transmit the downlink control channel CTRL and the downlink packet DLP in the same downlink symbol as shown in FIG. 12.

In some embodiments, a base station may allocate a downlink control channel to a low downlink symbol index of the ST subframe to guarantee a sufficient processing time for downlink packet decoding and uplink HARQ feedback generation of the terminal UEL. Then, the terminal can receive the downlink packet at an early timing and acquire the processing time. When the downlink control channel and the downlink packet are transmitted in different downlink symbols, the base station may transmit the downlink packet on a downlink symbol subsequent to the downlink control channel such that the terminal can receive the downlink packet at the early timing.

If the base station allocates the downlink symbol subsequent to the downlink control channel to the terminal UEL, downlink control channel reception and downlink packet reception may not occur consecutively in the terminal UEH. Since the terminal UEL uses a small number of downlink symbols to satisfy the low latency requirement, the base station may allocate a radio resource to the terminal UEH using the remaining downlink symbols. The terminal UEH may implicitly or explicitly receive a downlink symbol index offset indicating a start symbol allocated from a downlink assignment of a downlink control channel. For example, the terminal UE may implicitly estimate the downlink symbol index offset from a scheduling type included in the downlink assignment, or may explicitly receive the downlink symbol index offset through the downlink assignment. Therefore, as shown in FIG. 9, the terminal UEH can receive the downlink control channel and then demodulate a downlink packet DLP on downlink symbols after the downlink symbol index offset DL_Offset. The downlink symbol index offset DL_Offset may have an explicit value or an implicit value indicating one of several predetermined values.

Figure 13:
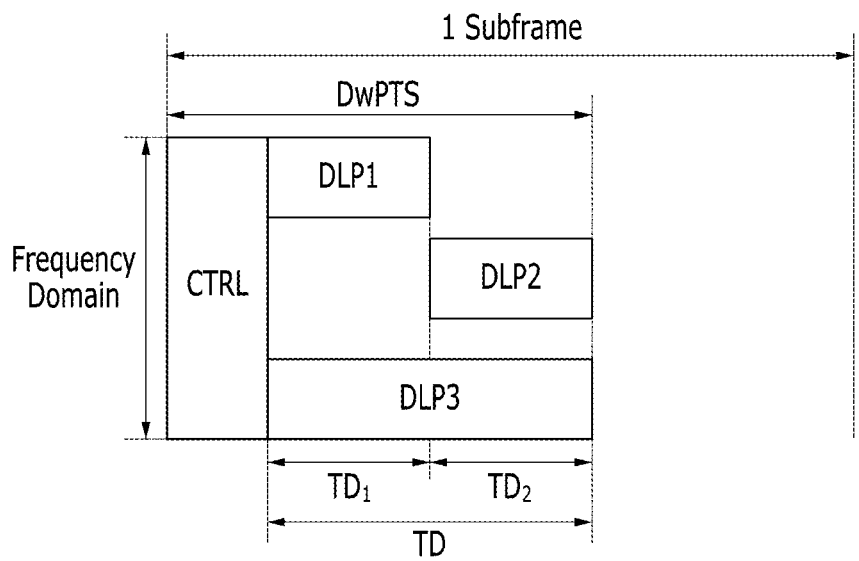

Referring to FIG. 13, when an FDM scheme and a TDM scheme are used together, a base station may multiplex a terminal UEL supporting low latency traffic and a terminal UEH supporting high latency traffic in the same downlink symbols. In an example shown in FIG. 13, some subcarriers of $TD_1$ downlink symbols subsequent to a downlink control channel including a downlink assignment may be allocated to the terminal UEL such that the terminal UEL can demodulate a downlink packet DLP1 transmitted through the $TD_1$ downlink symbols. In this case, some subcarriers of $TD_2$ downlink symbols after the $TD_1$ downlink symbols may be allocated to a terminal UEH as a radio resource, or some subcarriers that are not allocated to the terminal UEL among TD ($TD=TD_1+TD_2$) downlink symbols subsequent to the downlink control channel may be allocated to the terminal UEH as the radio resource. The terminal UEH may identify which type of radio resource is used from the downlink assignment. That is, the terminal UEH may confirm $TD_1$, $TD_2$, or TD, and subcarriers from the downlink assignment. When the terminal UEH uses the $TD_2$ downlink symbols, the terminal UEH may demodulate a downlink packet DLP2 from the $TD_2$ downlink symbols starting from the $(1+TD_1)$- th downlink symbol. The terminal UEH may demodulate a downlink packet DLP3 from the TD downlink symbols following the downlink control channel CTRL when the UEH uses the TD downlink symbols.

Next, a transmission method of an uplink HARQ feedback for a downlink packet is described with reference to FIG. 14 and FIG. 15.

Figure 14:
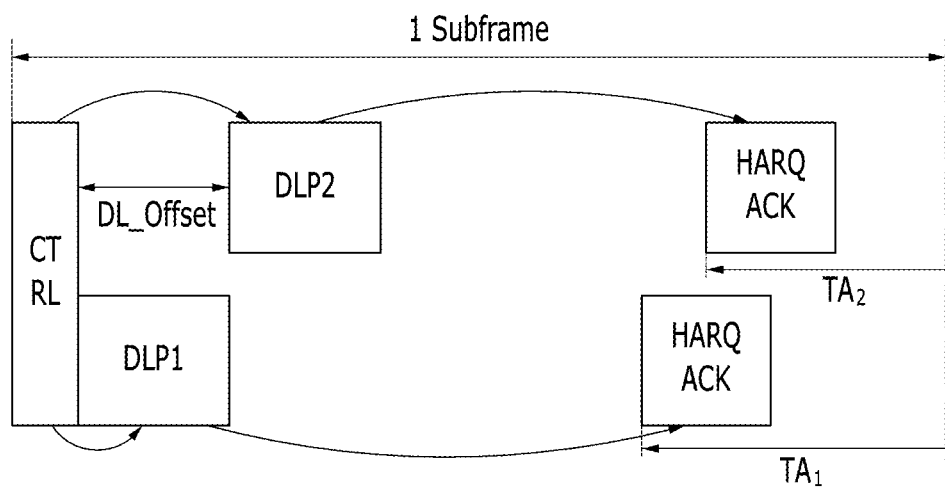
FIG. 14 and FIG. 15 each show a method of transmitting an uplink HARQ feedback in a wireless communication system according to an embodiment of the present invention.
Figure 15:
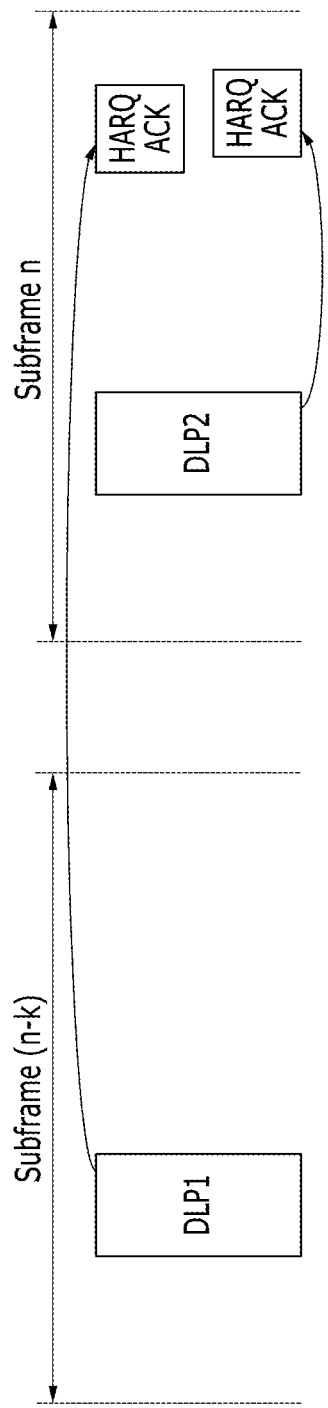

FIG. 14 and FIG. 15 each show a method of transmitting an uplink HARQ feedback in a wireless communication system according to an embodiment of the present invention. The uplink HARQ feedback for each transport block may be an uplink HARQ ACK or an uplink HARQ NACK. For convenience, the uplink HARQ feedback is shown as an HARQ ACK in FIG. 14 and FIG. 15.

Referring to FIG. 14, a base station may transmit a downlink packet in a downlink time duration of an ST subframe and receive an uplink HARQ feedback in an uplink time duration of the same subframe. When the base station transmits downlink packets having different symbol index offsets, for example a downlink packet DLP1 following a downlink control channel CTRL including a downlink assignment and a downlink packet DPL2 having a symbol index offset DL_Offset being greater than zero, on in the same subframe, a terminal demodulates the downlink packet DLP1 following the downlink control channel CTRL and generates an uplink HARQ feedback in accordance with an effective timing advance $TA_1$. Further, the terminal UE demodulates the downlink packet DLP2 having the symbol index offset DL_Offset and generates an uplink HARQ feedback in accordance with an effective timing advance $TA_2$. In some embodiments, the base station may allocate different radio resources to the two uplink HARQ feedbacks using a TDM scheme or an FDM scheme so that the base station can receive the two uplink HARQ feedback without collision. It is shown in FIG. 14 that different subcarriers are allocated to the two uplink HARQ feedbacks using the FDM scheme. The terminal UE can identify the radio resources necessary for the uplink HARQ feedback transmission from an uplink grant of the downlink control channel CTRL.

Referring to FIG. 15, a base station may receive an uplink HARQ feedback in the n-th subframe for a downlink packet DLP1 transmitted in the (n–k)-th subframe. Here, n and k are integers greater than or equal to 0. A feedback timing k indicating the delayed HARQ feedback timing may be informed to a terminal by the base station through a higher layer configuration or dynamic signaling (e.g., a downlink control channel), or their combination. In one embodiment, the base station may configure one value for the terminal through the higher layer signalling. In another embodiment, the base station may configure a plurality of feedback timing values k for the terminal through the higher layer signalling and indicate any one of the feedback timing values k through the dynamic signaling.

In some embodiments, the feedback timing value k may be configured differently for each downlink packet. For example, the feedback timing value k may be set to zero for a low-latency downlink packet DLP2 and the feedback timing value k may be configured to an integer being greater than or equal to one for a high-latency downlink packet DLP1. Therefore, as shown in FIG. 15, the base station may receive the uplink HARQ feedback in the n-th subframe for another downlink packet (for example, the low-latency downlink packet DPL2) transmitted in the n-th subframe.

In this manner, when a plurality of uplink HARQ feedbacks are transmitted in one ST subframe, the base station may allocate radio resources required for uplink HARQ feedback transmission according to the number of uplink HARQ feedbacks. The terminal may maintain the number of uplink HARQ feedbacks by performing multiplexing or may perform a bundling operation to reduce the number of uplink HARQ feedbacks. In one embodiment, the base station may configure either the multiplexing or bundling to the terminal through a higher layer signalling.

In some embodiments, when the base station sets HARQ feedback bundling for the terminal, the base station may inform the terminal of the number of uplink HARQ feedbacks to be transmitted by the terminal through the downlink assignment. The terminal may compare the number of received downlink packets with the number of uplink HARQ feedbacks informed by the base station and may regard that it fails to demodulate the downlink assignment if the two numbers are different from each other.

On the other hand, the HARQ feedback timing for the low-latency downlink packet may be 0 and the HARQ feedback timing for the high-latency downlink packet may be k. In this case, if terminal receives the high-latency downlink packet in the (n–k)-th subframe and receives another high-latency downlink packet and the low-latency downlink packet in the n-th subframe, the terminal may transmit an HARQ feedback for the high-latency downlink packet of the (n–k)-th subframe and an HARQ feedback for the low-latency downlink packet of the n-th subframe in the n-th subframe and transmit an HARQ feedback for the high-latency downlink packet of the n-th subframe in the (n+k)-th subframe. In this case, the terminal may bundle the two HARQ feedbacks in the n-th subframe.

Next, a method of transmitting an uplink packet using a radio frame according to an embodiment of the present invention is described with reference to FIG. 16 to FIG. 19.

FIG. 16, FIG. 17, FIG. 18, and FIG. 19 each show an uplink transmission method in a wireless communication system according to an embodiment of the present invention.

When a terminal transmits an uplink packet in an uplink time duration of an ST subframe to a base station, the base station may transmit a downlink HARQ feedback in a downlink time duration of the same ST subframe. The downlink HARQ feedback may be a downlink HARQ ACK or a downlink HARQ NACK. For convenience, the downlink HARQ feedback is shown as an HARQ ACK in FIG. 16 to FIG. 19.

Figure 16:
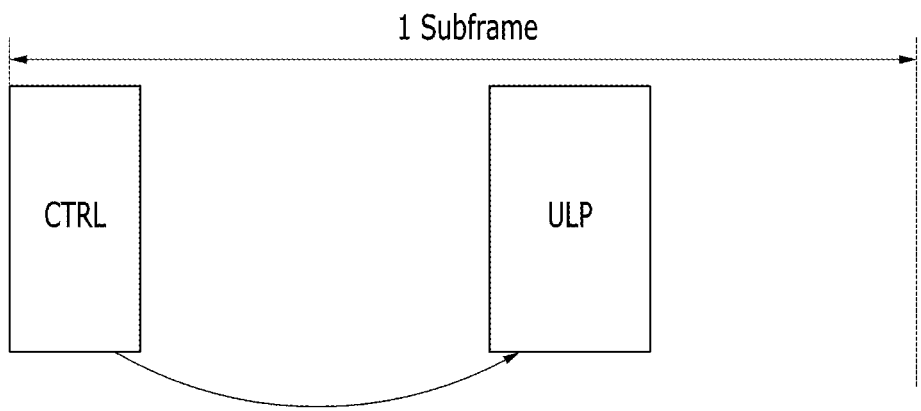
FIG. 16, FIG. 17, FIG. 18, and FIG. 19 each show an uplink transmission method in a wireless communication system according to an embodiment of the present invention.
Figure 17:
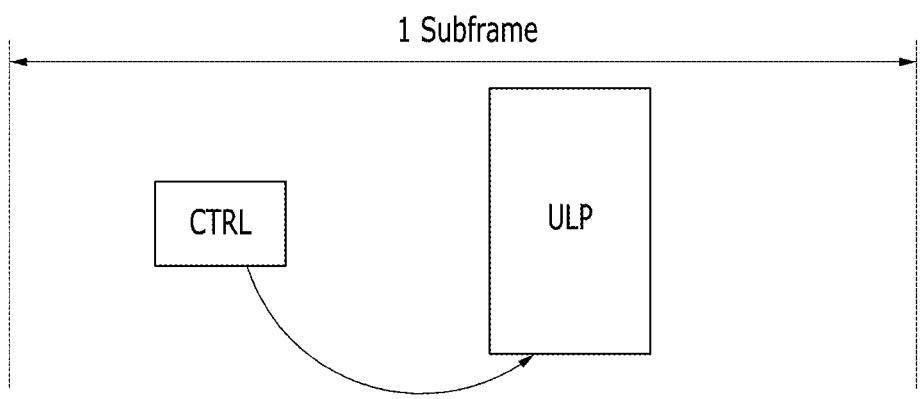
Figure 18:
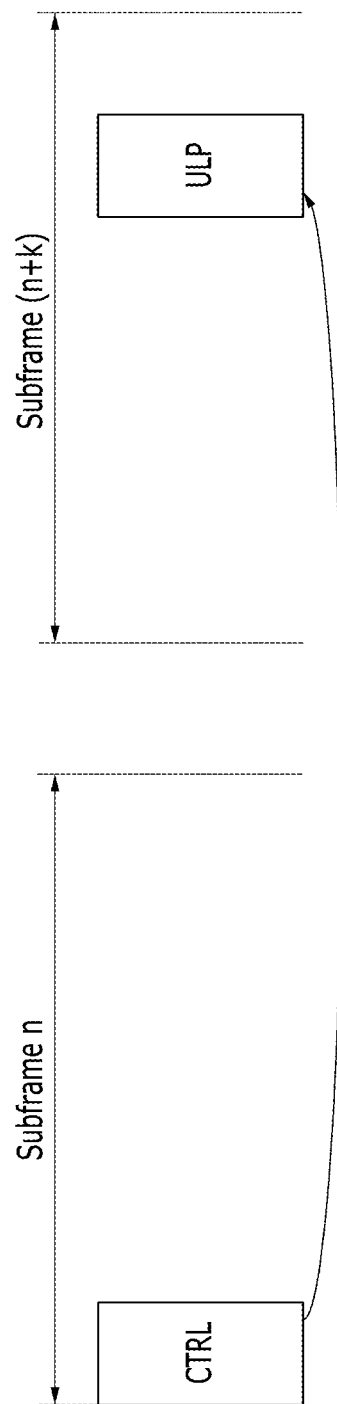
Figure 19:
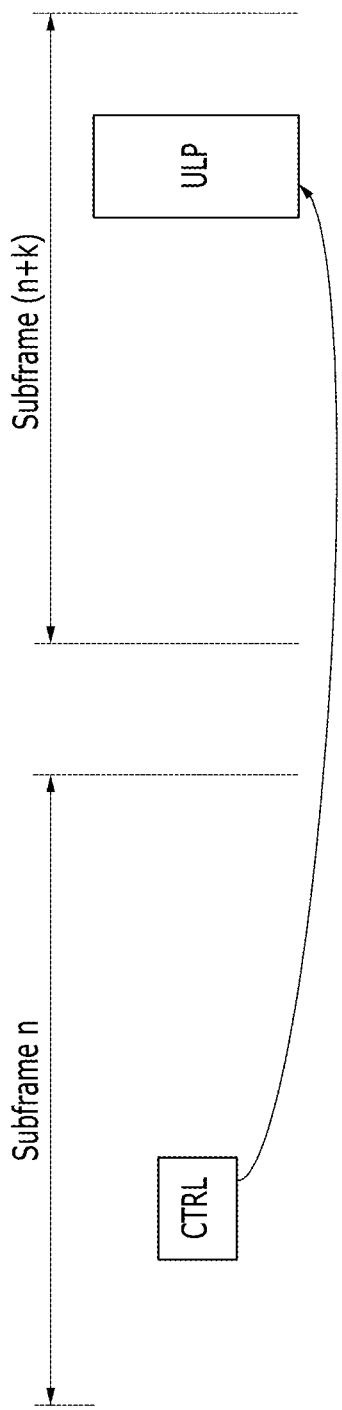

Referring to FIG. 16, FIG. 17, FIG. 18, and FIG. 19, the base station transmits an uplink grant to the terminal through a downlink control channel CTRL, and the terminal transmits an uplink packet ULP based on the uplink grant. As shown in FIG. 16 and FIG. 17, the uplink packet ULP may be transmitted in the uplink time duration of the ST subframe in which the downlink control channel CTRL including the uplink grant is transmitted. Alternatively, as shown in FIG. 18 and FIG. 19, the uplink packet ULP may be transmitted in an ST subframe (for example, subframe (n+k)) different from the ST subframe (for example, subframe n) in which the control channel CTRL including the uplink grant is transmitted. As shown in FIG. 16 and FIG. 18, the control channel CTRL including the uplink grant may be transmitted through a beginning downlink symbol(s) of the ST subframe. Alternatively, as shown in FIG. 17 and FIG. 19, the control channel CTRL including the uplink grant may be transmitted in the same symbols as a downlink packet for other terminals in the ST subframe.

In some embodiments, a size of an uplink packet may be limited to a predetermined size or less in order to transmit a downlink HARQ feedback for the uplink packet in the same subframe as the uplink packet. To this end, a base station may segment the uplink packet so that the size of each uplink packet can become the predetermined size or less. Then, a time required for a base station to decode the uplink packet can be reduced. In this case, the base station may allocate a radio resource corresponding to a small number of uplink symbols such that a short packet can be confined to a short time and use a sufficient bandwidth, and schedule the radio resource to the terminal. In one embodiment, the number of uplink symbols to be applied to short packet scheduling may be configured through a higher layer signalling. In this case, the number of uplink symbols may be implicitly or explicitly indicated. For example, the number of UL symbols may be implicitly indicated in a manner of predetermined number of UL symbols according to traffic types and explicitly indicating a specific traffic type, or the number of UL symbols may be explicitly indicated. In another embodiment, the number of UL symbols to be applied to the short packet scheduling may be included in the downlink assignment. Those set of uplink symbols may correspond to an uplink sub-slot.

Next, a method of transmitting a downlink HARQ feedback for an uplink packet is described with reference to FIG. 20 to FIG. 22

Figure 20:
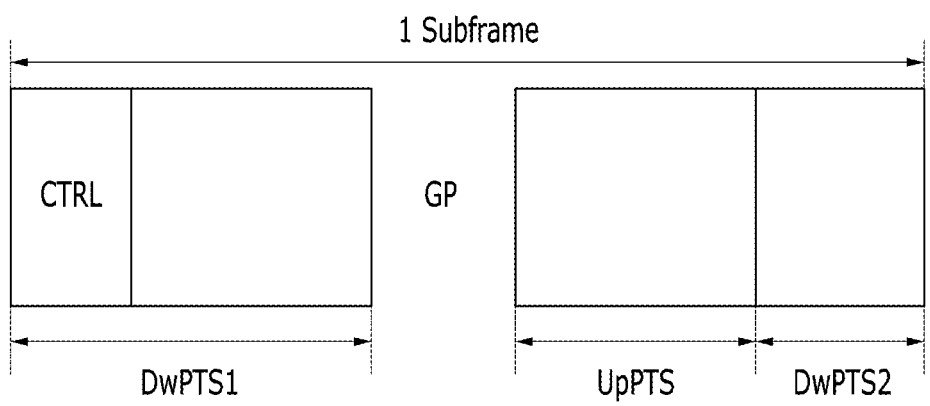
FIG. 20 shows another example of an ST subframe structure in a wireless communication system according to an embodiment of the present invention.
Figure 21:
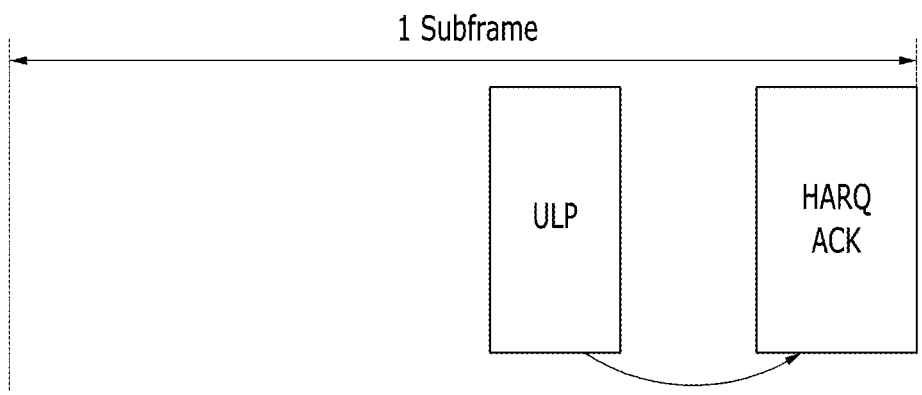
FIG. 21 and FIG. 22 each show a method of transmitting a downlink HARQ feedback in a wireless communication system according to an embodiment of the present invention.
Figure 22:
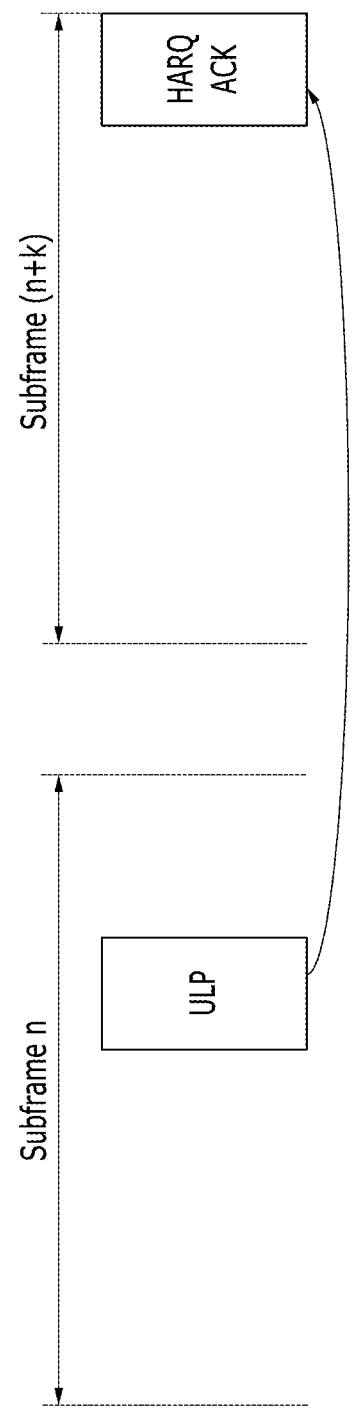

FIG. 20 shows another example of an ST subframe structure in a wireless communication system according to an embodiment of the present invention, and FIG. 21 and FIG. 22 each show a method of transmitting a downlink HARQ feedback in a wireless communication system according to an embodiment of the present invention. The downlink HARQ feedback may be a downlink HARQ ACK or a downlink HARQ NACK. For convenience, the downlink HARQ feedback is shown as an HARQ ACK in FIG. 21 and FIG. 22.

In some embodiments, to support a low-latency uplink traffic, a terminal may transmit an uplink packet after demodulating a downlink assignment and receive a downlink HARQ feedback in the same ST subframe. To this end, as shown in FIG. 20, the ST subframe may further include a downlink time duration DwPTS2 after an uplink time duration UpPTS. That is, the ST subframe may include a downlink time duration DwPTS1, a guard period GP, an uplink time duration UpPTS, and a downlink time duration DwPTS2. Therefore, the terminal may demodulate a downlink control channel CTRL transmitted in the first downlink time duration DwPTS1, transmit the uplink packet in the uplink time duration UpPTS, and then receive a downlink HARQ feedback in the second downlink time duration DwPTS2. Consequently, the terminal can support the low-latency uplink traffic.

As described in the uplink HARQ feedback, a value k indicating HARQ feedback timing may be set to zero or an integer being greater than or equal to one. As shown in FIG. 21, a base station may receive an uplink packet and then transmit a downlink HARQ feedback in the same subframe. Alternatively, as shown in FIG. 22, the base station may receive an uplink packet in the n-th subframe and then transmit a downlink HARQ feedback for the uplink packet in the (n+k)-th subframe.

When using the downlink HARQ feedback, the terminal stores an uplink packet which has been already transmitted and then perform retransmissions or not depending on a demodulation result at the base station which can be known to the terminal through the downlink HARQ feedback. If the downlink HARQ feedback is ACK, the terminal does not need to keep the uplink packet stored in a buffer, and thus deletes the uplink packet from the buffer. If the downlink HARQ feedback is NACK, the terminal may hold the stored uplink packet stored during a predetermined time for retransmission.

In some embodiments, the base station may not transmit a downlink HARQ feedback for an uplink packet transmitted by the terminal. In this case, the terminal may manage the buffer according to an uplink grant. If the base station succeeds in demodulating the uplink packet, the base station schedules a new uplink packet. At this time, the base station may schedule the new uplink packet using the same identifier (ID), for example, the same HARQ process ID. Then, the terminal may not store the uplink packet stored in the buffer any longer, and store the new uplink packet. On the other hand, if the base station fails to demodulate the uplink packet, the base station schedules to retransmit the same uplink packet but with different redundancy version. At this time, the base station may schedule the uplink packet using the same ID, for example, the same HARQ process ID. Then, the terminal can maintain the uplink packet stored in the buffer during a predetermined time for a possible retransmission.

In some embodiments, a base station may configure an ST subframe for each terminal. This embodiment is described with reference to FIG. 23.

Figure 23:
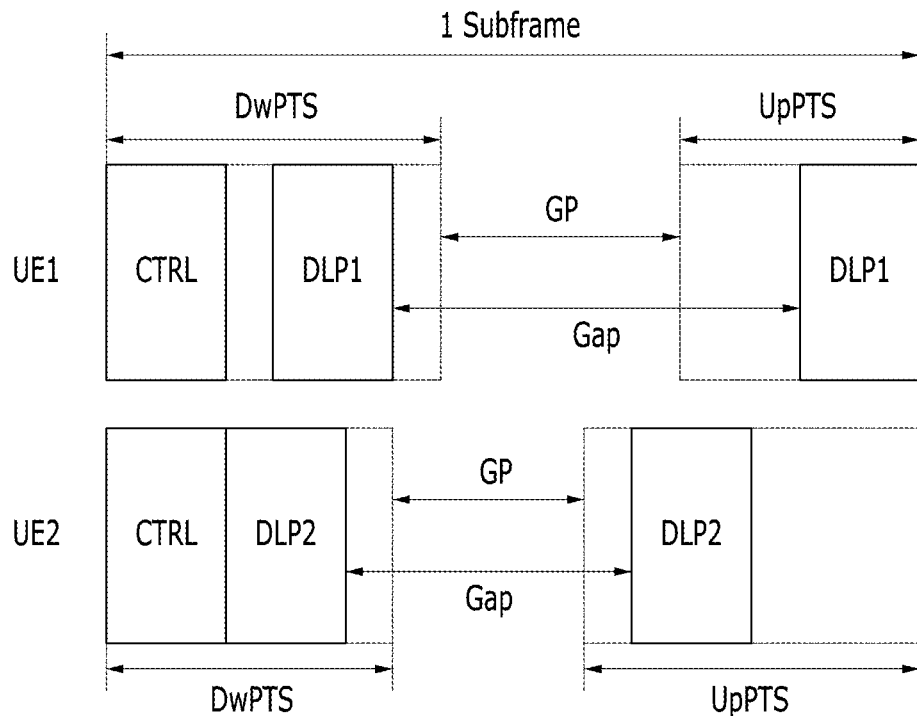
FIG. 23 shows a terminal-specific ST subframe in a wireless communication system according to an embodiment of the present invention.

FIG. 23 shows a terminal-specific ST subframe in a wireless communication system according to an embodiment of the present invention.

Referring to FIG. 23, in some embodiments, the base station may configure a terminal-specific ST subframe. FIG. 23 shows an example in which the base station configures different terminal-specific ST subframes for the two terminals UE1 and UE2. In one embodiment, the base station may configure the terminal specific ST subframe through a higher layer signaling.

In the two ST subframes for the terminals UE1 and UE2, downlink control channels CTRL may be indicated to have the same time duration. Lengths of the downlink time durations DwPTS or lengths of the uplink time durations UpPTS may be configured differently according to the terminals UE1 and UE2.

In one embodiment, the base station may adjust a ratio between the downlink time duration DwPTS and the uplink time duration UpPTS in consideration of a ratio between the downlink traffic and the uplink traffic for the terminals UE1 and UE2.

In one embodiment, the downlink time duration DwPTS may defined from the beginning of the ST subframe, and the uplink time duration UpPTS may be defined from the end of the ST subframe. In this case, a time duration excluding the downlink time duration DwPTS and the uplink time duration UpPTS corresponds to a guard period GP. In one embodiment, when a downlink packet duration DL1 or DL2 or an uplink packet duration UL1 or UL2 allocated to a certain terminal corresponds to a part of the downlink time duration DwPTS or the uplink time duration, the BS may adjust a gap between reception of the downlink packet DL1 or DL2 and transmission of the uplink packet UL1 or UL2 by adjusting a start symbol offset of the downlink packet duration or the uplink packet duration. In this case, the base station may adjust the gap according to processing capability of the terminal.

Then, the guard period interpreted by the base station may correspond to a time duration in which all terminals may regard as the gaps, and may be located in the middle of the subframe. The length of the guard period GP may be determined by the base station and may be zero. Even if the length of the guard period GP is zero, the terminal can exploit a time corresponding to the gap between the reception end point of the downlink packet and the transmission timing of the uplink packet.

When the downlink packet durations of the terminals UE1 and UE2 are different from each other or start symbol offsets are different from each other, a downlink symbol on which the downlink packets DL1 and DL2 overlap with each other or a downlink symbol on which the downlink packets DL1 and DL2 do not overlap with each other may exist. Since an inter-cell interference may change during transmission of the downlink packets DL1 and DL2, the base station may perform scheduling for interference management. Similarly, when the uplink packet duration UL1 and UL2 of the two terminals UE1 and UE2 are different from each other or start symbol offsets are different from each other, an uplink symbol on which the uplink packets UL1 and UL2 overlap with each other or an uplink symbol on which the uplink packets UL1 and UL2 do not overlap with each other may exist. Since an inter-cell interference may change during transmission of the uplink packets UL1 and UL2, the base station may perform scheduling for interference management.

As described above, when the base station configures the ST subframe through the higher layer signalling, the base station may reconfigure a downlink time duration and an uplink time duration of the ST subframe for the terminal using another higher layer signaling in order to change the ST subframe configuration. This method cannot adapt quickly to a change in the ratio between the downlink traffic and the uplink traffic generated in the ST subframe. In case of using a dynamic TDD in a wireless communication system operating in an unpaired spectrum, it is necessary to adjust the ratio between a downlink resource and an uplink resource more quickly. Accordingly, in some embodiments, the base station may control the downlink resource and the uplink resource based on the downlink control channel rather than the higher layer signaling.

Figure 24:
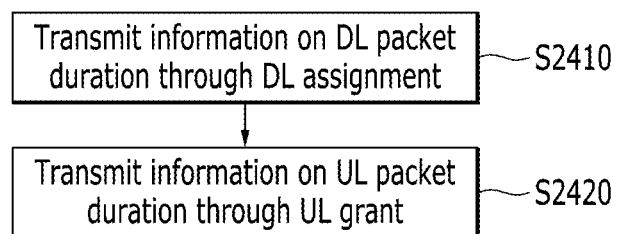
FIG. 24 is a flowchart showing a method of scheduling an ST subframe in a wireless communication system according to an embodiment of the present invention.

FIG. 24 is a flowchart showing a method of scheduling an ST subframe in a wireless communication system according to an embodiment of the present invention.

Referring to FIG. 24, in some embodiments, a base station may not configure a downlink time duration and an uplink time duration of an ST subframe in advance. Accordingly, the base station transmits information on a downlink packet duration through a downlink assignment of a downlink control channel (S2410), and transmits information on an uplink packet duration through an uplink grant of the downlink control channel (S2420). Then, a terminal can receive a downlink packet in the downlink packet duration and transmit an uplink packet in the uplink packet duration without recognizing a specific position of a guard period within the subframe.

In some embodiments, the base station may notify the terminal of a timing k for indicating a transmission timing used by the terminal. In this case, the base station may inform the timing k through the higher layer signaling or a DCI of the downlink control channel, or their combination.

In one embodiment, when the base station configures a downlink transmission mode through a higher layer signaling, the base station may indicate the timing k for transmitting an uplink HARQ feedback and an uplink duration for the uplink HARQ feedback. In this case, the terminal can know the transmission timing of the uplink HARQ feedback as the k-th subframe after receiving the downlink control channel. That is, when the downlink control channel is transmitted in subframe n, the terminal can identify subframe (n+k) as the transmission timing of the uplink HARQ feedback. In another embodiment, if the base station separately transmits a timing $k_{DL}$ through the DCI of the downlink control channel in subframe n, the terminal may transmit the uplink HARQ feedback in subframe (n+$k_{DL}$). In this case, the downlink control channel may include information on the uplink duration for transmitting the uplink HARQ feedback.

In one embodiment, when the base station configures an uplink transmission mode through the higher layer signaling, the base station may configure a timing k for transmitting uplink data and an uplink duration for the uplink data. In this case, the terminal can know the transmitting timing of the uplink data as the k-th subframe after receiving the downlink control channel. That is, when the downlink control channel is transmitted in subframe n, the terminal can identify subframe (n+k) as the transmission timing of the uplink data. In another embodiment, if the base station separately transmits a timing $k_{UL}$ through the DCI of the downlink control channel in subframe n, the terminal may transmit the uplink data in subframe (n+$k_{UL}$). In this case, the downlink control channel may include information on the uplink packet duration for transmitting the uplink data.

In some embodiments, the timing k may be implicitly configured to zero in a wireless communication system for a low latency communication and may not be configured explicitly through the DCI of the downlink control channel. Then, the terminal may transmit the uplink HARQ feedback or the uplink data using an uplink packet duration configured by a downlink assignment and an uplink grant, respectively, in the same subframe as a subframe where the downlink control channel is received.

In some embodiments, a guard period may be removed from the ST subframe. Hereinafter, such an embodiment is described with reference to FIG. 25 to FIG. 28.

Figure 25:
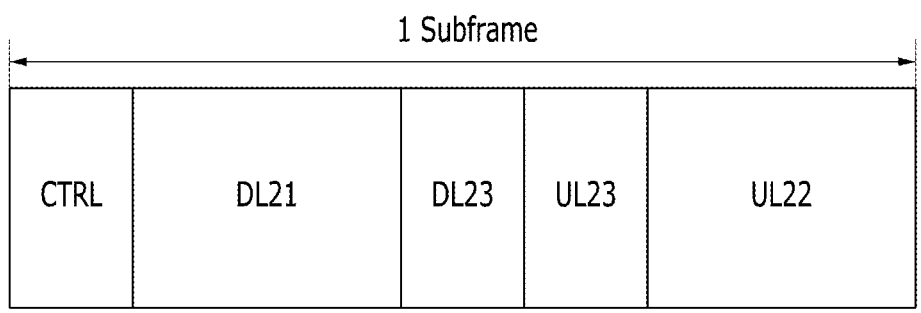
FIG. 25 and FIG. 26 each show an ST subframe without a guard interval in a wireless communication system according to an embodiment of the present invention.
Figure 26:
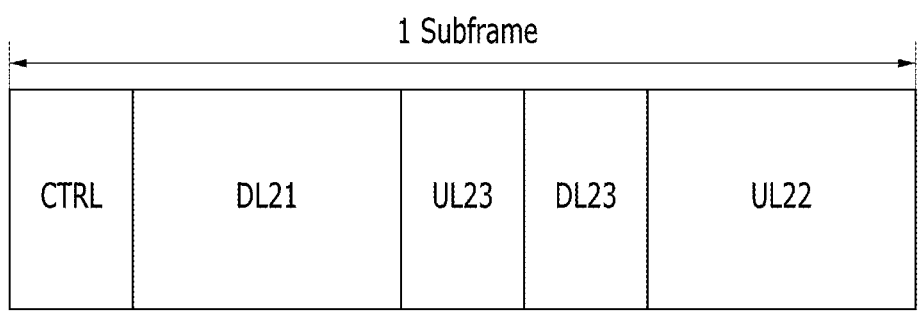
Figure 27:
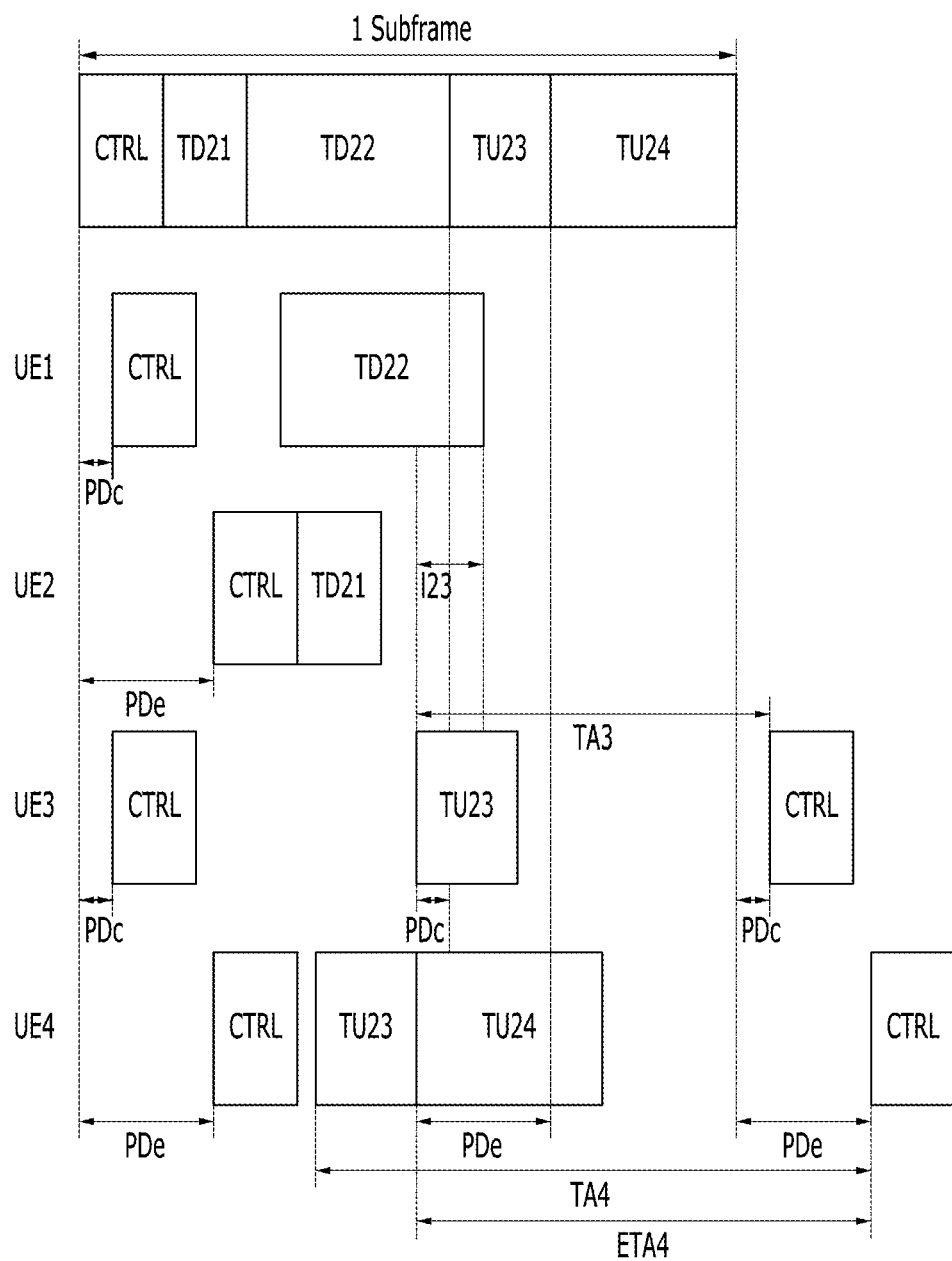
FIG. 27 shows a transmission method using an ST subframe in a wireless communication system according to an embodiment of the present invention.
Figure 28:
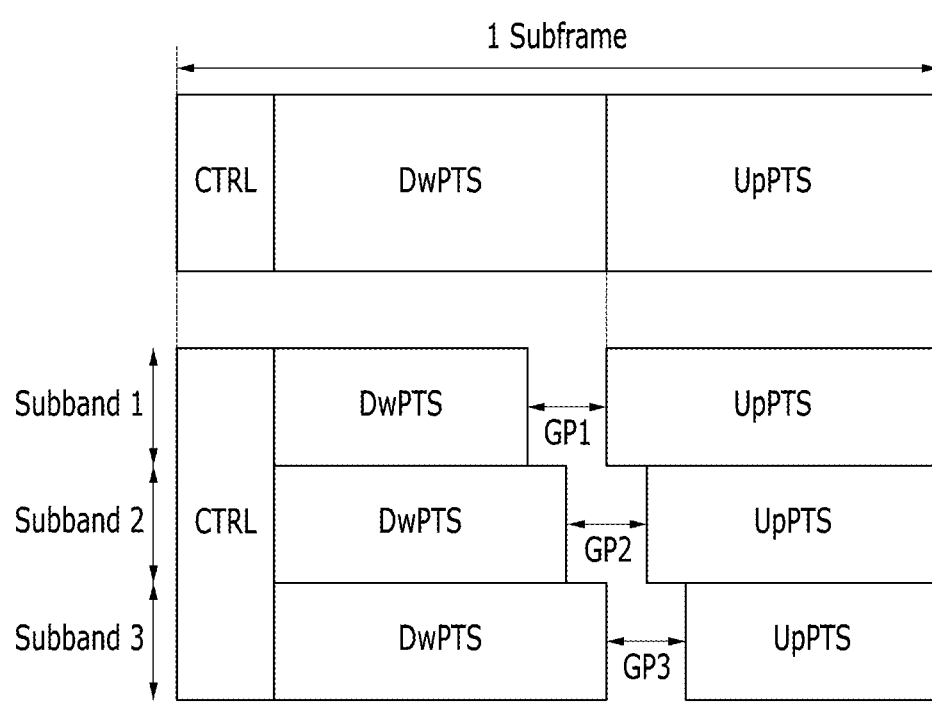
FIG. 28 shows an ST subframe configured for each subband in a wireless communication system according to an embodiment of the present invention.

FIG. 25 and FIG. 26 each show an ST subframe without a guard interval in a wireless communication system according to an embodiment of the present invention, FIG. 27 shows a transmission timing using an ST subframe in a wireless communication system according to an embodiment of the present invention. ST subframe, and FIG. 28 shows an ST subframe configured for each subband in a wireless communication system according to an embodiment of the present invention.

In some embodiments, a base station may configure terminal-specific ST subframes to a plurality of terminals. In this case, the base station may configure a terminal-specific downlink TTI and a terminal-specific uplink TTI to each of the terminals. In one embodiment, the base station may configure the terminal-specific ST subframe through a higher layer signaling or a downlink control channel, or their combination. In one embodiment, the base station may configure a downlink time duration, an uplink time duration, and a guard period through the higher layer signaling in an ST subframe configuration, and may configure a downlink packet duration and an uplink packet duration through the higher layer signaling in a transmission mode configuration. In another embodiment, a downlink assignment may include information on the downlink packet duration and an uplink grant may include information on the uplink packet duration.

In this case, guard periods having different lengths may be indicated to the terminals, and the base station may determine the downlink packet duration and the uplink packet duration to each terminal in consideration of the downlink coverage and the uplink coverage.

Referring to FIG. 25 and FIG. 26, it is assumed that a base station performs a downlink assignment to a terminal UE1 and performs an uplink grant to another terminal UE2. Then, a guard period may exist between a downlink packet duration DL21 of the terminal UE1 and an uplink packet duration UL22 of the terminal UE2. In this case, the base station may perform scheduling for other terminal UE3 at a time duration corresponding to the guard period. The base station may perform a downlink assignment of a downlink packet duration DL23 and an uplink grant of an uplink packet duration UL23 for the terminal UE3 during the time duration corresponding to the guard period as shown in FIG. 25. Alternatively, as shown in FIG. 26, the base station may perform an uplink scheduling of an uplink packet duration UL23 and a downlink assignment of a downlink packet duration DL23 for the terminal UE3.

In this case, no interference among the terminals UE1, UE2, and UE3 may occur due a propagation delay difference and a timing advance difference. As shown in FIG. 26, when the terminal UE1 performs reception and the terminal UE3 performs transmission, no interference may occur since the reception of the terminal UE1 has already been completed at the transmission time of the terminal UE3 due to a propagation delay between the terminals UE1 and UE3. In addition, as shown in FIG. 25, when the terminal UE3 performs transmission after reception, if the propagation delay is negligibly small, the terminal UE3 may not perform the transmission and reception at the same time. That is, the terminal UE3 may satisfy the half duplex constraint. For example, if the terminal UE3 is located at a very close position of the base station, the propagation delay and the timing advance of the terminal UE3 may be regarded as zero.

In FIG. 25 and FIG. 26, the uplink packet duration UL23 may be not allocated to the terminal UE3 but be allocated to other terminal UE4 located at a position similar to the terminal UE3 through the uplink grant. No intra-cell interference may occur even when the downlink packet duration DL23 is allocated to the terminal UE3 and the uplink packet duration UL23 is allocated to the terminal UE4.

Meanwhile, it may be considered a case where the propagation delay and the timing advance of the terminal UE 3 are smaller than half of a cyclic prefix (CP) length of CP-based OFDM (CP-OFDM). In an LTE system, since half of the normal CP is 2.3437 μs [=(144/2)*Ts=(144/2)*(1/(2048*15000))], a value (=703.125 m) obtained by multiplying half of the normal CP by the speed of light is the coverage when the half of the CP length is used. In a case of dense urban areas of LTE or 5G NR (new radio), an inter-site distance may be considered as 200 m. Therefore, the coverage in a real communication environment may be within half of the normal CP of the LTE system. In this case, the terminal UE 3 may experience an inter-symbol interference in some delay spread. In the case where the terminal UE 3 receives the inter-symbol interference, the received intra-symbol interference is a signal of the terminal UE3 itself, the terminal UE3 may perform equalization in the reception process or the base station may adjust the MCS to remove interference effects.

As such, the base station may configure the terminal-specific ST subframe to the terminal through a higher layer signaling. Further, the base station may configure a downlink packet duration having a length of TD2$i$ to a terminal UE$i$. In this case, the base station may transmit a start symbol index to the terminal UE$i$ through a higher layer signaling, a DCI of a downlink control channel, or a combination thereof. Furthermore, the base station may configure an uplink packet duration of length TU2$i$ to the terminal UE$i$. In this case, the base station may transmit a start symbol index to the terminal UE$i$ through a higher layer signaling, a DCI of a downlink control channel, or a combination thereof. Therefore, a length GP2$i$ of a guard period for the terminal UE$i$ can be adjusted through the downlink assignment and the uplink grant by the base station BS.

In another embodiment, the base station may indicate the downlink packet duration and the uplink packet duration using only the downlink control channel without using the higher layer signaling.

In some embodiments, the base station may configure the same ST subframe for the terminals. The ST subframe may not include a guard period but may include only a downlink packet duration and an uplink packet duration. That is, the base station may not configure a cell-specific guard period. Then, the base station may, by implementation, guarantee a terminal-specific guard period to the terminal such that the terminal can acquire a processing latency.

As such, since all the terminals commonly receive the downlink control channel but the respective terminals may have downlink packet durations or uplink packet durations having different lengths, the base station can flexibly perform scheduling such that throughput can be improved.

However, the downlink packet duration DL2$i$ of a certain terminal UE$i$ and an uplink packet duration UL2$j$ of other terminal UE$j$ may interfere with each other. This is because the downlink packet duration DL2$i$ of the terminal UE$i$ and the uplink packet duration UL2$j$ of the terminal UE$j$ may overlap in time when a timing advance is largely applied to the terminal UE$j$. Similarly, interference may occur between the downlink packet duration DL2$i$ and an uplink packet duration UL2$i$ of the same terminal UE$i$. In order to prevent performance deterioration due to such the interference, the base station may schedule the downlink packet durations and the uplink packet durations according to the timing advance distribution of the terminals UE$i$ and UE$j$.

It is assumed that terminals located close to a base station have the same propagation delay PDc and the same timing advance TAc and terminals located far from a base station have the same propagation delay PDe and the same timing advance TAe. Here, the propagation delay PDe is greater than the propagation delay PDc. It is shown in FIG. 27 that terminals UE1 and UE3 are located close to the base station DEV1, terminals UE2 and UE4 are located far from the base station, the terminals UE1 and UE2 operate in downlink, and the terminals UE3 and UE4 operation in uplink. Further, a downlink packet duration TD21 is allocated to the downlink of the terminal UE1, a downlink packet duration TD22 following the downlink packet duration TD21 is allocated to the downlink of the terminal UE2, an uplink packet duration TU23 is allocated to the uplink of the terminal UE3, and an uplink packet duration TU24 following the uplink packet duration TU23 is allocated to the uplink of the terminal UE4.

Then, the terminal UE1 receives a downlink control channel CTRL after the propagation delay PDc, and then receives a downlink packet in the downlink packet duration TD22. The terminal UE2 receives the downlink control channel CTRL after the propagation delay PDe and then receives a downlink packet in the downlink packet duration TD21. The terminal UE3 receives the downlink control channel CTRL after the propagation delay PDc and then transmits an uplink packet in the uplink packet duration TU23 in accordance with an effective timing advance ETA3. The effective timing advance ETA3 may be determined by reflecting an uplink symbol index offset (0 in the example of FIG. 26) to a timing advance TA3, and the timing advance TA3 may be determined in consideration of the propagation delay PDc. The terminal UE4 receives the downlink control channel CTRL after the propagation delay PDe and then transmits an uplink packet in the uplink packet duration TU24 in accordance with an effective timing advance ETA4. The effective timing advance ETA4 may be determined by reflecting an uplink symbol index offset (TU23 in the example of FIG. 27) to a timing advance TA4, and the timing advance TA4 may be determined in consideration of the propagation delay PDe.

In this case, as shown in FIG. 27, since the two terminals UE1 and UE3 have the same propagation delay PDc, the uplink packet transmitted by the terminal UE3 may affect the downlink packet received by the terminal UE2 during a certain time interval I23. That is, the terminal UE3 may cause an inter-cell interference to the terminal UE2. However, since the uplink packet transmitted by the terminal UE4 arrives at the terminal UE2 after the propagation delay difference (PDe−PDc) between the two terminals UE4 and UE2, the uplink packet of the terminal UE4 may have little effect on the downlink packet of the terminal UE2. Therefore, if the time interval I23 described above is small enough, e.g., within the cyclic prefix, the terminals UE1 to UE4 can communicate without the intra-cell interference.

In one embodiment, if the time interval I23 is smaller than the cyclic prefix, the base station may not allocate a cell-specific guard period symbol in that subframe or slot.

In another embodiment, if the time interval I23 is greater than the cyclic prefix, the base station may allocate a guard period to prevent the interference. The guard period may be allocated specifically to the terminal. Various methods of allocating the guard period are described below.

According to one method, the base station may reduce the downlink packet duration TD22 allocated to the terminal UE1 to allocate the guard period. For example, the base station may reduce the downlink packet duration TD22 by the time interval I23, from the downlink-uplink switching boundary, and configure the guard period GP as long as the reduced duration of TD22. To this end, the base station may transmit information on the guard period GP to the terminal UE1 through a downlink assignment of the downlink control channel. Alternatively, the base station may transmit information on the reduced downlink packet duration TD22 to the terminal UE1.

According to another method, the base station may reduce the uplink packet duration TU23 allocated to the terminal UE3 to allocate the guard period. For example, the base station may reduce the uplink packet duration TU23 by the time interval I23, from the downlink-uplink switching boundary, and configure the guard period GP as long as the reduced duration of TU23. To this end, the base station may transmit information on the guard period GP to the terminal UE3 through an uplink grant of the downlink control channel. Alternatively, the base station may transmit information on the reduced uplink packet duration to the terminal UE3.

According to yet another method, the base station may reduce both the downlink packet duration TD22 allocated to the terminal UE1, and the uplink packet duration TU23 allocated to the terminal UE3, to allocate the guard period. For example, the base station may reduce the downlink packet duration TD22 and the uplink packet duration TU22 by the time interval I23, and configure the guard period GP as long as the reduced downlink and uplink durations TD22 and TU22. To this end, the base station may transmit information on the guard period GP to the terminal UE2 through the downlink allocation of the downlink control channel, and transmit the information on the guard period GP to the terminal UE3 through the uplink grant of the downlink control channel. Alternatively, the base station may transmit the information on the reduced downlink packet duration' to the terminal UE2, and transmit the information on the reduced uplink packet duration to the terminal UE3.

According to still another method, as shown in FIG. 28, different methods may be applied to a plurality of schedulable subbands belonging to the same ST subframe. In this case, the cell-specific guard period may not be allocated, and the guard period GP in each subband may be allocated to the ST subframe in each corresponding subband. Referring to FIG. 28, a guard period GP1 is allocated to a part of a downlink time duration DwPTS in subband 1, a guard period GP2 is allocated to a part of the downlink time duration DwPTS and a part of an uplink time duration UpPTS in subband 2, and a guard period GP3 is allocated to a part of the uplink time duration UpPTS in subband 3.

While an example that where a downlink control channel CTRL is transmitted in a wide band is shown in FIG. 28, but the downlink control channel CTRL may be defined in each subband independently and also be transmitted in each subband.

As described above, when a large amount of traffic is processed in the wireless communication system, a larger amount of traffic can be processed by not setting the cell-specific guard period.

Next, various examples of a transmission method using an ST subframe are described with reference to FIG. 29 to FIG. 31.

Figure 29:
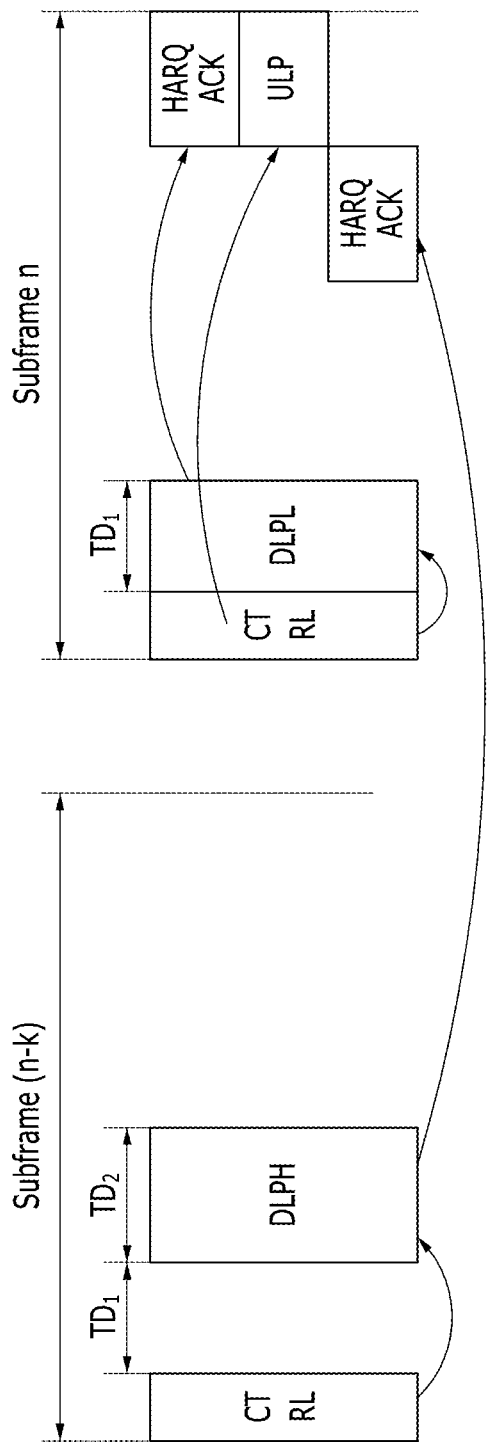
FIG. 29 shows an example of a transmission method using a plurality of scheduling types in a wireless communication system according to an embodiment of the present invention.
Figure 30:
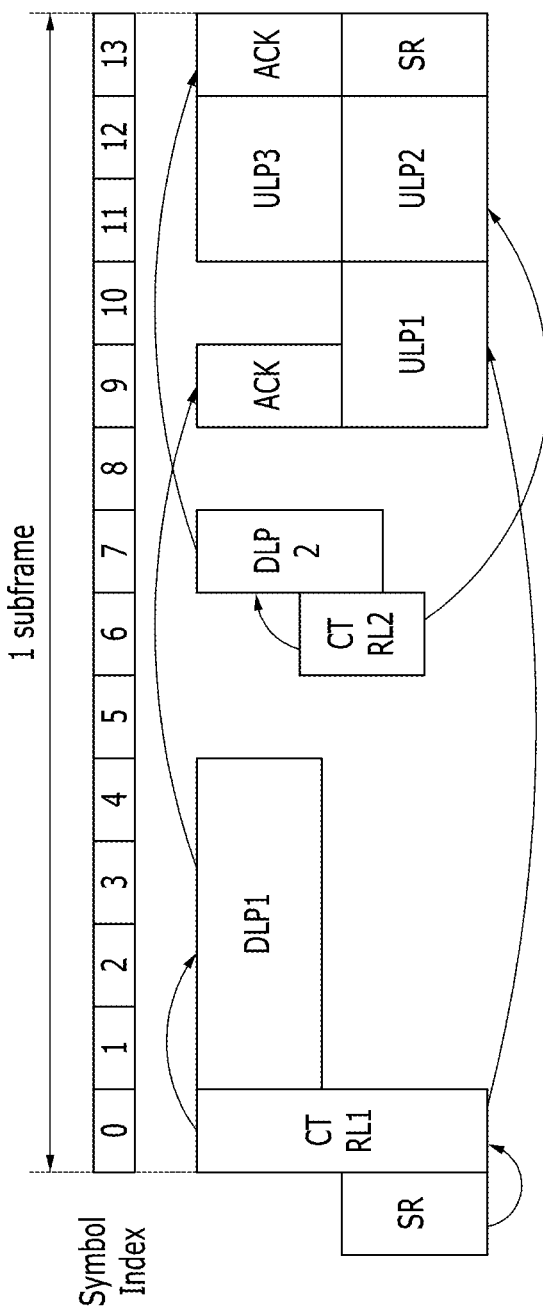
FIG. 30 and FIG. 31 each show an example of a low-latency traffic transmission method in a wireless communication system according to an embodiment of the present invention.
Figure 31:
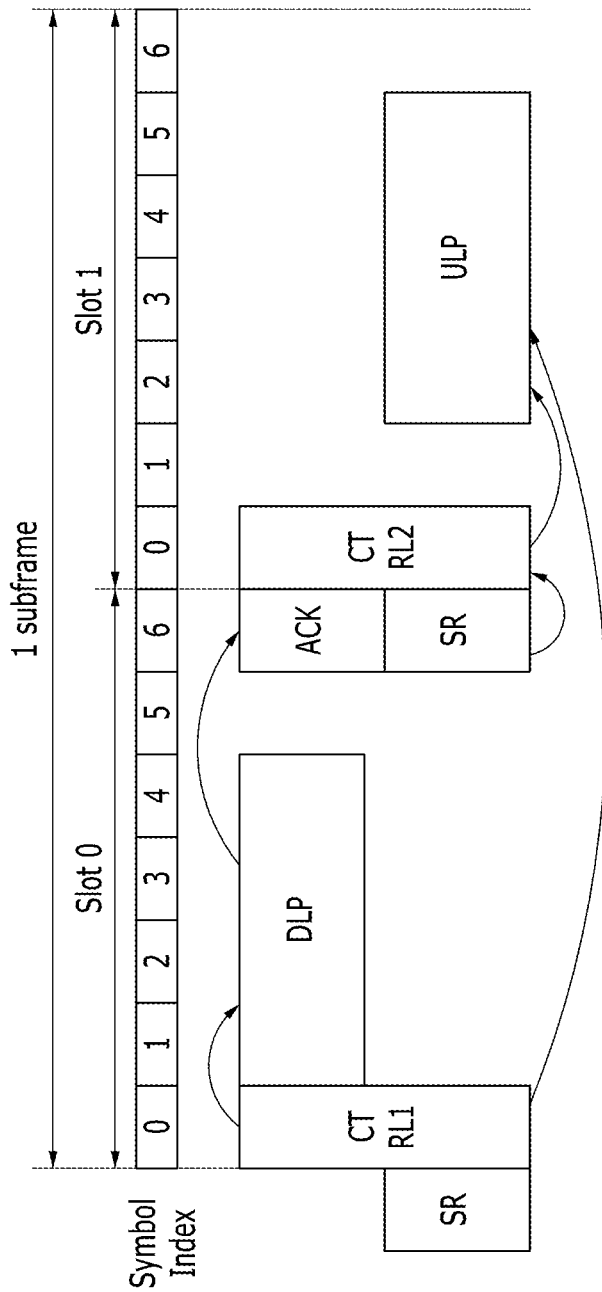

FIG. 29 shows an example of a transmission method using a plurality of scheduling types in a wireless communication system according to an embodiment of the present invention, and FIG. 30 and FIG. 31 each show an example of a low-latency traffic transmission method in a wireless communication system according to an embodiment of the present invention.

Referring to FIG. 29, a base station may have a plurality of scheduling types. The plurality of scheduling types may include a type L transferring low latency traffic and a type H transferring high latency traffic.

When a terminal demodulates a downlink control channel CTRL and determines that a scheduling type is type L, the terminal demodulates a downlink packet DLPL for the low latency traffic in a downlink packet duration $TD_1$ corresponding to type L. The downlink packet duration $TD_1$ may be detected through a higher layer signaling or a downlink assignment of the downlink control channel CTRL, or their combination. For example, the downlink packet DLPL for the low latency traffic may be transmitted in succession to the downlink control channel CTRL. The terminal may transmit an uplink HARQ feedback for the downlink packet DLPL for the low latency traffic in the same subframe (subframe n) as the downlink packet DLPL. Further, when the downlink control channel CTRL delivers an uplink grant for the low latency traffic, the terminal may transmit an uplink packet ULP in the same subframe (subframe n) as the downlink control channel CTRL.

When the terminal demodulates the downlink control channel CTRL and determines that the scheduling type is type H, the terminal demodulates a downlink packet DLPH for the high latency traffic in a downlink packet duration $TD_2$ corresponding to type H. The downlink packet duration $TD_2$ may be detected through the higher layer signaling or the downlink assignment of the downlink control channel CTRL, or their combination. For example, the downlink packet for the high latency traffic may be transmitted in the downlink packet duration $TD_2$ following the downlink packet duration $TD_1$ allocated to the downlink packet for the low latency traffic. The terminal may transmit an uplink HARQ feedback for the downlink packet DLPH for the high latency traffic in a subframe (subframe n) after k subframes from a subframe (subframe (n−k)) where the downlink packet DLPH is received.

In some embodiments, a base station may transmit a downlink control channel CTRL by including a value k indicating an HARQ feedback timing to the downlink assignment. For example, if the k value is zero, a terminal may transmit an HARQ feedback in a subframe where a downlink packet is received. If the k value is one or more, the terminal may transmit the HARQ feedback after k subframes from a subframe where the downlink packet is received.

In some embodiments, a base station may not perform a downlink HARQ feedback. In this case, the base station demodulates an uplink packet transmitted from a terminal and does not transmit an HARQ ACK to the terminal when the demodulation is successful. Since the terminal may be indicated to retransmit the same uplink packet through a uplink grant from the base station within a predetermined time window, the terminal may not discard the uplink packet before the predetermined time expires. If the base station fails to demodulate the uplink packet, base station does not need to transmit an HARQ NACK to the terminal. Instead, the base station may request the same uplink packet of possibly different redundancy version to the terminal through an uplink grant.

A case where only low latency traffic exists is described. In this case, one ST subframe may support all of downlink transmission, uplink transmission, and an uplink HARQ feedback.

Referring to FIG. 30, a base station may transmit a downlink assignment to a terminal UE1 and an uplink grant to a terminal UE2 through a downlink control channel. The base station may transmit downlink control channels CTRL1 and CTRL2 twice.

The terminal UE1 may receive the downlink control channel CTRL1, for example, in a symbol with symbol index 0. A downlink packet duration indicated by the downlink control channel CTRL1 may be, for example, four symbols from symbol index 1, and a duration corresponding to an HARQ feedback may be, for example, a symbol with symbol index 9. Then, the terminal UE1 receives a downlink packet DLP1 on the four symbols starting from symbol index 1, and transmits an uplink HARQ feedback on the symbol with symbol index 9. The base station may determine whether to perform retransmission of the downlink packet DLP1 based on the uplink HARQ feedback.

When the base station further transmits a low latency traffic to the terminal UE1, the base station may further transmit the downlink control channel CTRL2 on a symbol with a predetermined symbol index (e.g., symbol index 6). Then, the terminal can receive the downlink control channel CTRL2 on the predetermined symbol with symbol index 6. A downlink packet duration indicated by the downlink control channel CTRL2 may be, for example, a symbol with symbol index 7, and a duration corresponding to an uplink HARQ feedback may be, for example, a symbol with symbol index 13. Then, the terminal can receive a symbol downlink packet DLP2 on the symbol with symbol index 7 and can transmit an uplink HARQ feedback on the symbol with symbol index 13.

When another terminal UE2 generates uplink traffic, the terminal UE2 may receive an uplink grant from the base station through the downlink control channel CTRL1. In this case, the terminal UE2 may have transmitted a scheduling request SR to the base station in order to request the uplink grant. Then, the terminal UE2 can transmit an uplink packet ULP1 in an uplink packet duration indicated by the uplink grant, for example, two symbols from symbol index 9 corresponding to an effective timing advance.

When the base station receives an additional low latency traffic from the terminal UE2, the base station may transmit an uplink grant to the terminal UE2 in the downlink control channel CTRL2 transmitted in the predetermined symbol index, e.g., symbol index 6. Then, the terminal UE2 can transmit an uplink packet ULP2 in an uplink packet duration indicated by the uplink grant, for example, two symbols from symbol index 11 corresponding to an effective timing advance.

In some embodiments, it may happen that the terminal UE2 generates low latency uplink traffic but cannot wait for a resource for the scheduling request allocated by the base station. Accordingly, the base station may allocate to the terminal UE2 a predetermined uplink resource or a preconfigured uplink resource, i.e., an uplink packet duration, where an uplink packet can be transmitted without an uplink grant. Thus, the terminal UE2 may transmit an uplink packet ULP3 even if there is no uplink grant. The base station may allocate this uplink resource through semi-persistent (SP) scheduling. In this case, the base station may perform the SP scheduling for one terminal but may perform the SP scheduling of the same uplink resources or uplink resources whose part being overlapped for a plurality of terminals.

Referring to FIG. 31, one ST subframe may include two slots. In this case, the base station may transmit a downlink assignment to a terminal UE1 through a downlink control channel CTRL1 in slot 0. Then, the terminal UE1 may receive a downlink packet DLP in a downlink packet duration (e.g., four symbols from symbol index 1) indicated by the downlink control channel CTRL1 and transmit an HARQ feedback. The base station may transmit an uplink grant to the terminal UE2 through a downlink control channel CTRL2 in slot 1. Then, the terminal UE2 may transmit an uplink packet ULP in an uplink packet duration (e.g., four symbols from symbol index 2) indicated by the downlink control channel CTRL2. Further, the terminal UE2 may transmit a scheduling request SR to the base station for uplink transmission.

Figure 32:
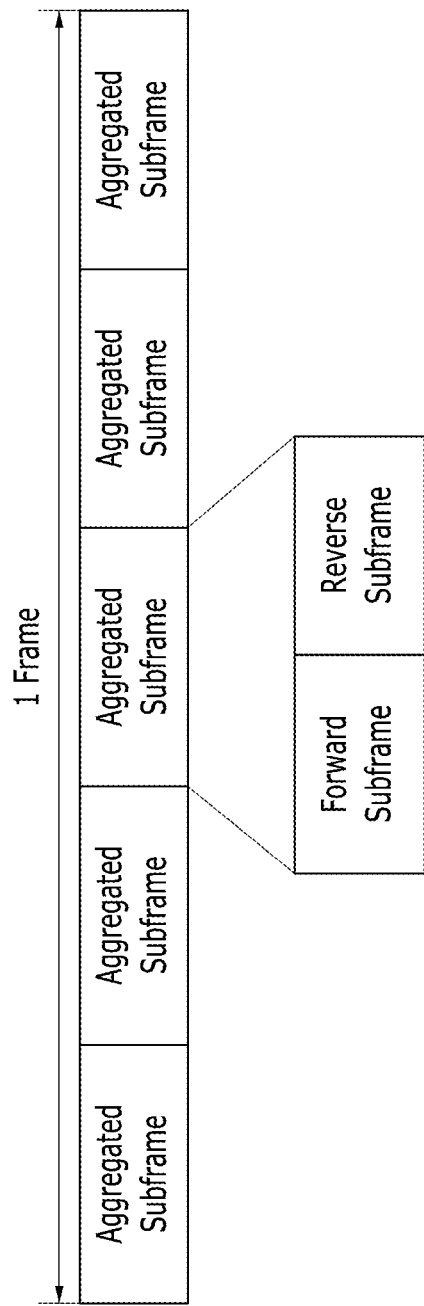
FIG. 32 shows a radio frame structure used in a wireless communication system according to another embodiment of the present invention.

FIG. 32 shows a radio frame structure used in a wireless communication system according to another embodiment of the present invention.

Referring to FIG. 32, a radio frame includes a plurality of subframes. Some subframes may be forward subframes and some subframes may be reverse subframes in the radio frame. One forward subframe and one reverse subframe are aggregated to form an aggregated subframe. It is shown in FIG. 32 that the radio frame includes ten subframes and the ten subframes form five aggregated subframes. Alternatively, only some subframes in the radio frame may form the aggregated subframe. In another embodiment, the aggregated subframe may be formed in the order of the reverse subframe and the forward subframe. In yet another embodiment, the aggregated subframe may be formed by at least some subframes among ST subframes, downlink subframes, and uplink subframes instead of the two ST subframes.

In some embodiments, the base station may inform the terminal of a forward subframe configuration and a reverse subframe configuration via a higher layer signaling.

Figure 33:
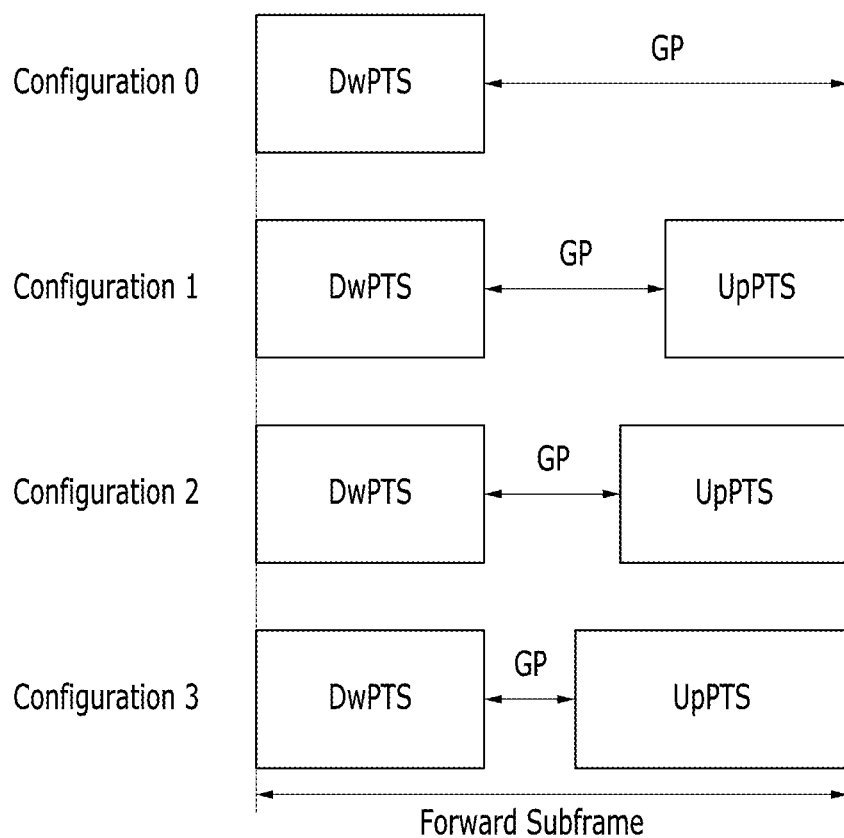
FIG. 33 shows forward subframe configurations in a radio frame structure according to another embodiment of the present invention.
Figure 34:
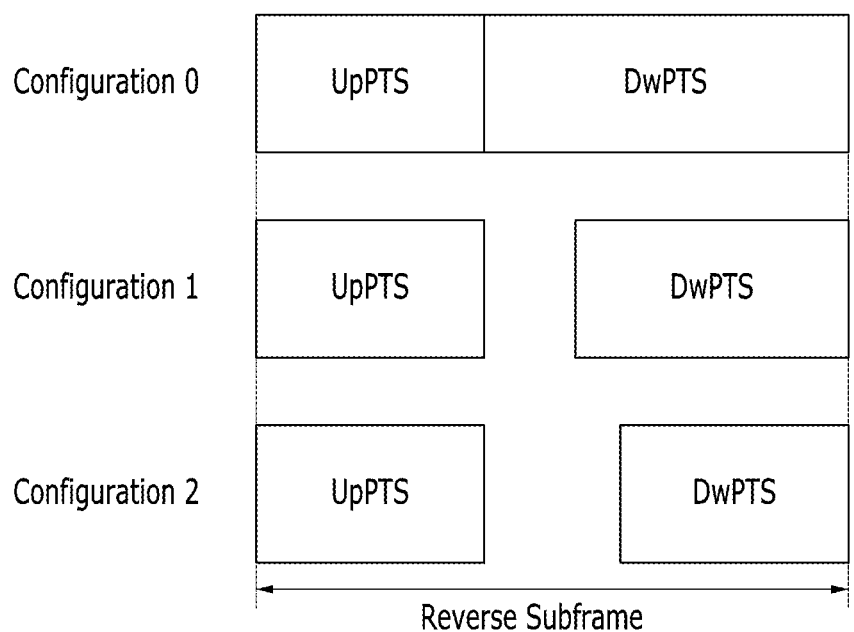
FIG. 34 shows reverse subframe configurations in a radio frame structure according to another embodiment of the present invention.
Figure 35:
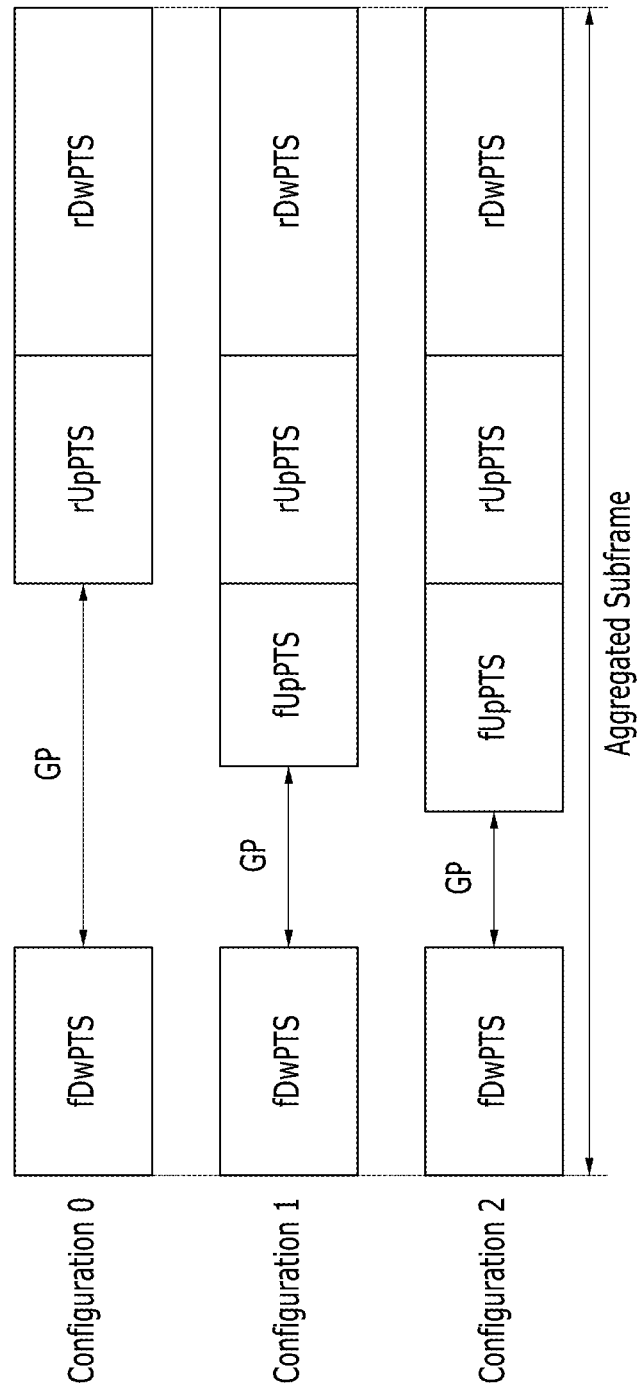
FIG. 35 shows aggregated subframe configurations in a radio frame structure according to another embodiment of the present invention.

FIG. 33 shows forward subframe configurations in a radio frame structure according to another embodiment of the present invention, FIG. 34 shows reverse subframe configurations in a radio frame structure according to another embodiment of the present invention, and FIG. 35 shows aggregated subframe configurations in a radio frame structure according to another embodiment of the present invention.

Referring to FIG. 33, a forward subframe includes a downlink time duration DwPTS, an uplink time duration UpPTS following the downlink time duration DwPTS, and a guard period GP between the downlink time duration DwPTS and the uplink time duration UpPTS. The downlink time duration DwPTS consists of consecutive transmission of downlink symbols, and the uplink time duration UpPTS consists of consecutive transmission of uplink symbols. The downlink symbol and the uplink symbol may have different modulation schemes, different numerologies, different subcarrier spacings, or different cyclic prefix lengths.

In FIG. 33, four forward subframe configurations (configuration 0, configuration 1, configuration 2, and configuration 3) are shown as an example. The forward subframe configuration may be determined by a length of a downlink time duration DwPTS and a length of an uplink time duration UpPTS. The forward subframe of configuration 0 does not include an uplink time duration but includes a downlink time duration DwPTS and a guard period GP following the downlink time duration DwPTS. The forward subframe of configurations 1, 2, or 3 includes a downlink time duration DwPTS and an uplink time duration UpPTS. The lengths of the downlink time durations DwPTS and/or the lengths of the uplink time durations UpPTS are different from each other. For convenience, only a case where the lengths of the uplink time durations UpPTS are different is shown in FIG. 33. In this case, a guard period GP is located between the downlink time slot DwPTS and the uplink time slot UpPTS, and the length of the guard period GP may vary depending on a length differences of the downlink time slots DwPTS and/or the uplink time durations UpPTS.

The base station estimates the guard period GP in consideration of propagation delay and delay spread. The base station may select one of a plurality of forward subframe configurations based on the estimated guard period GP and inform the terminal of an index of the selected forward subframe configuration. In some embodiments, the forward subframe configuration index may be transmitted as system information. In one embodiment, the forward subframe configuration index may be included as a cell-specific message of a downlink control channel. Then, the terminal can recognize the number of downlink symbols belonging to the downlink time duration and the number of uplink symbols belonging to the uplink time duration based on the received forward subframe configuration index.

If the forward subframe does not include a downlink time duration, the terminal in an idle state may not recognize that forward subframe so that an initial access or radio resource management (RRM) measurement of the terminal may be inefficient. Thus, in some embodiments, all forward subframes may have a downlink time duration having at least a minimum length. That is, a predetermined number of symbols in the forward subframe may always be allocated to downlink. Then, the terminal may perform the RRM measurement using the predetermined number of symbols. Further, when a downlink control channel is transmitted with a predetermined number of symbols, the terminal can receive a forward subframe configuration included in the downlink control channel.

Referring to FIG. 34, a reverse subframe includes an uplink time duration UpPTS and a downlink time duration DwPTS following the uplink time duration UpPTS, and an additional time may be assigned between the uplink time duration UpPTS and the downlink time duration DwPTS. This additional time may be used as a circuit switching time of the base station, a physical downlink discovery channel, or a physical downlink header channel. The uplink time duration UpPTS consists of consecutive transmission of uplink symbols and the downlink time duration DwPTS consists of consecutive transmission of downlink symbols. The uplink symbol and the downlink symbol may have different modulation schemes, different numerologies, different subcarrier spacings, or different cyclic prefix lengths.

In FIG. 34, three reverse subframe configurations (configuration 0, configuration 1, and configuration 2) are shown as an example. The reverse subframe configuration may be determined by a length of the uplink time duration UpPTS and a length of the downlink time duration DwPTS. In the reverse subframe of configuration 0, 1, or 2, the length of the uplink time duration UpPTS and/or the length of the downlink time duration DwPTS are different for each other. For convenience, only a case where the lengths of the downlink time durations DwPTS are different is shown in FIG. 34. In this case, the additional time between the uplink time duration UpPTS and the downlink time duration DwPTS may vary depending on the difference of the uplink time durations UpPTS and/or the downlink time duration DwPTS.

The base station may select one of a plurality of reverse subframe configurations and inform the terminal of an index of the selected reverse subframe configuration. In some embodiments, the reverse subframe configuration index may be transmitted as system information. In one embodiment, the reverse subframe configuration index may be included as a cell-specific message of a downlink control channel. Then, the terminal can recognize the number of uplink symbols belonging to the uplink time duration UpPTS and the number of downlink symbols belonging to the downlink time duration DwPTS based on the received uplink subframe configuration index.

The base station may transmit the downlink control channel in the downlink time duration of the reverse subframe. The downlink control channel transmitted in the reverse subframe may not include a cell-specific message. In this case, the terminal can be indicated for a resource allocation of the downlink control channel transmitted in the reverse subframe from the reverse subframe configuration.

If the reverse subframe does not include a downlink time duration, the terminal in an idle state may not recognize the reverse subframe so that an initial access or RRM management of the terminal may be inefficient. Thus, in some embodiments, all reverse subframes may have a downlink time duration having at least a minimum length. That is, a predetermined number of symbols in the reverse subframe may always be allocated to downlink. Then, the terminal may perform the RRM measurement with the predetermined number of symbols. Further, when a downlink control channel is transmitted on the predetermined number of symbols, the terminal can receive the reverse subframe configuration included in the downlink control channel.

Referring to FIG. 35, an aggregated subframe is a subframe in which a forward subframe and a reverse subframe are consecutively connected. The subframe includes a downlink time duration fDwPTS, uplink time durations fUpPTS1 and rUpPTS2 following the downlink time duration fDwPTS, and a downlink time duration rDwPTS. A guard period GP may be located between the downlink time duration fDwPTS and the uplink time duration fUpPTS or rUpPTS if the uplink time duration fUpPTS is not present.

In FIG. 35, three aggregated subframe configurations (configuration 0, configuration 1, and configuration 2) are shown as an example. The aggregated subframe configuration may be determined by lengths of the uplink time durations fUpPTS and rUpPTS and the downlink time durations fDwPTS and rDwPTS. For convenience, only a case where the lengths of the uplink time durations fUpPTS corresponding to the forward subframe are different from each other is shown in FIG. 35. In this case, a length of a guard period GP located between the downlink time duration fDwPTS and the uplink time duration fUpPTS may vary depending on the aggregated subframe configurations or forward subframe configurations.

The terminal can know the number of downlink symbols and the number of uplink symbols belonging to each of the forward subframe and the reverse subframe in the aggregated subframe through the aggregated subframe configuration.

Next, a downlink packet transmission method in a wireless communication system according to another embodiment of the present invention is described with reference to FIG. 36 and FIG. 37.

Figure 36:
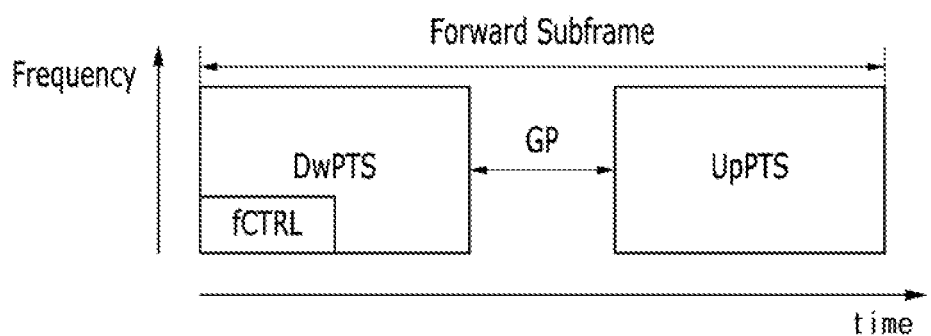
FIG. 36 and FIG. 37 each show a downlink transmission method in a wireless communication system according to another embodiment of the present invention.
Figure 37:
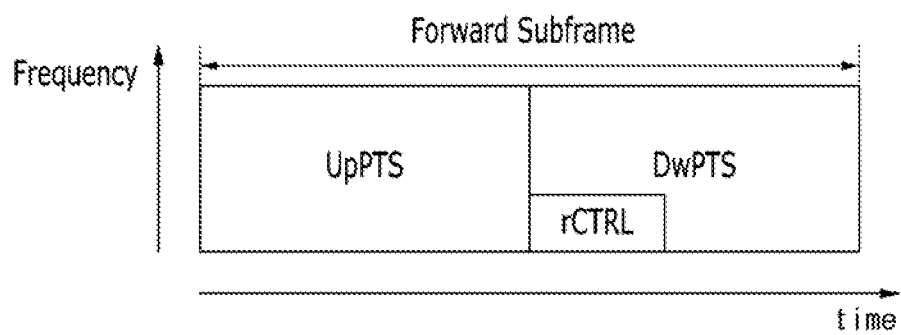

FIG. 36 and FIG. 37 each show a downlink transmission method in a wireless communication system according to another embodiment of the present invention.

A base station using an aggregated subframe may transmit a downlink control channel in a forward subframe or a reverse subframe. In this case, the downlink control channel may coexist with a downlink packet in a TDM scheme or an FDM scheme. A DCI of the downlink control channel may be transmitted using a distributed subcarrier set to obtain frequency diversity, and may or may not use all of the system bandwidth.

The downlink control channel may transmit both or one of a cell-specific message and a terminal-specific message. System information may be transmitted in a physical broadcasting channel (PBCH) or in a downlink packet indicated by the downlink control channel.

In some embodiments, the downlink control channel may be allocated to a subband of the system bandwidth, i.e., some subcarriers, to improve downlink throughput. Referring to FIG. 36, a downlink control channel fCTRL may be transmitted by using a time/frequency localized resource in a downlink time duration fDwPTS of a forward subframe. Referring to FIG. 37, a downlink control channel rCTRL may be transmitted by using a time/frequency localized resource in a downlink time duration rDwPTS of an uplink subframe.

If a large number of downlink symbols are included in the downlink time duration fDwPTS of the forward subframe or the downlink time duration rDwPTS of the reverse subframe, a downlink control channel may be transmitted through only a subset of the downlink symbols such that time diversity can be obtained. However, when a small number of downlink symbols are included in the downlink time duration fDwPTS or rDwPTS, the downlink control channel may be transmitted on only a set of adjacent downlink symbols since symbol index hopping within a coherence time is not meaningful. For example, when the coherent time is defined as a duration of two downlink symbols, the time diversity can be obtained if the first and ninth symbols is used as a symbol subset for the downlink control channel in a downlink time duration having nine downlink symbols. However, in a downlink time duration having two downlink symbols, the time diversity cannot be obtained since all of the two symbols are used for the downlink control channel for channel capacity.

Next, a downlink transmission method using an aggregated subframe formed in order of a reverse subframe and a forward subframe is described with reference to FIG. 38 and FIG. 39.

Figure 38:
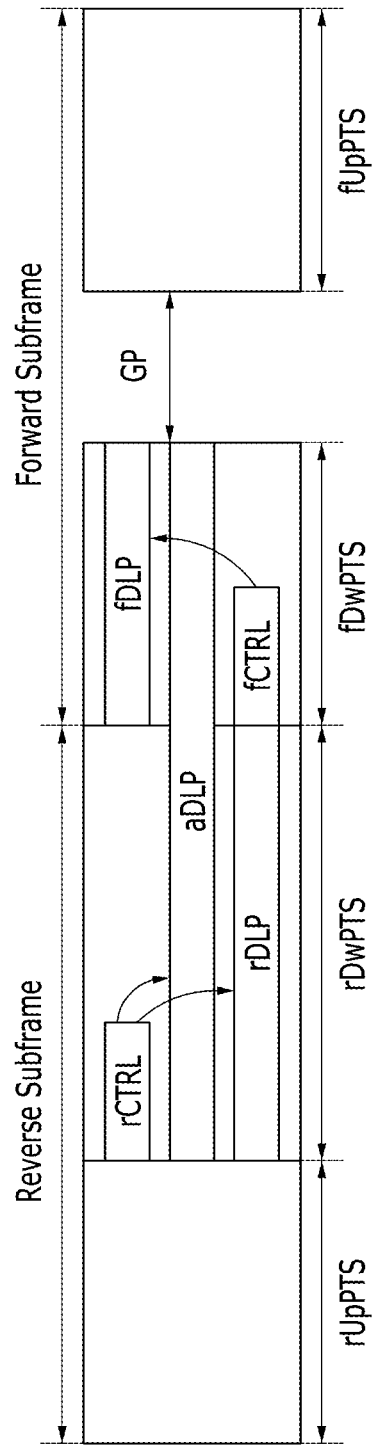
FIG. 38 and FIG. 39 each show a downlink transmission method using an aggregated subframe in a wireless communication system according to another embodiment of the present invention.
Figure 39:
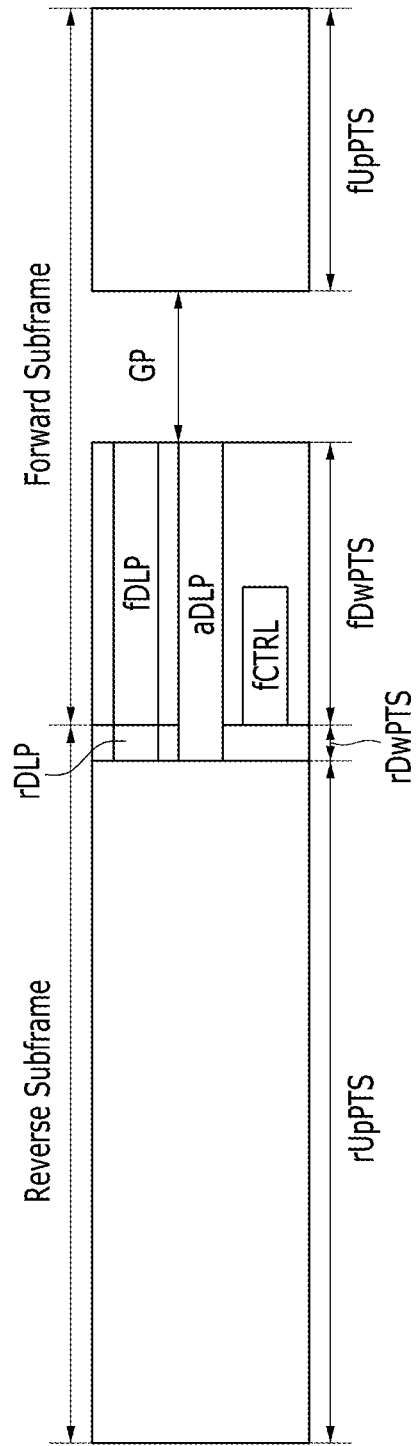

FIG. 38 and FIG. 39 each show a downlink transmission method using an aggregated subframe in a wireless communication system according to another embodiment of the present invention.

In some embodiments, a downlink packet may be allocated in a downlink time duration rDwPTS of a reverse subframe and a downlink time duration fDwPTS of a forward subframe following the downlink time duration rDwPTS in an aggregation subframe. One or two transport blocks may be assigned to this downlink packet and an HARQ feedback may be configured for each transport block.

When one transport block is allocated to the downlink packet, one transport block may be allocated to the two downlink time durations rDwPTS and fDwPTS such that a larger transport block can be used. Therefore, the base station can provide the higher downlink throughput to a terminal with low mobility.

However, since the two downlink time durations rDwPTS and fDwPTS to which the downlink packet is allocated may have different interference conditions, an optimal MCS and precoding may be different for the downlink time durations. Therefore, in some embodiments, the terminal may decode the transport block while receiving one downlink packet, assuming that the MCS is the same for the two subframes but the precoding may be different for the two subframes. In some embodiments, the terminal may decode the transport block while receiving one downlink packet, assuming that different antenna ports are allocated to the downlink time durations but the same large scale fading is applied to the downlink time durations.

In some embodiments, the downlink control channel fCTRL transmitted in the downlink time duration of the forward subframe and the downlink control channel rCTRL transmitted in the downlink time duration of the reverse subframe may be defined by a type of the downlink control channel. In this case, referring to FIG. 38, a downlink packet fDLP transmitted in the downlink time duration fDwPTS of the forward subframe may be associated with the downlink control channel fCTRL. A downlink packet rDLP transmitted in the downlink time duration rDwPTS of the reverse subframe or a downlink packet aDLP transmitted in downlink time durations rDwPTS and fDwPTS of the aggregated subframe may be associated with the downlink control channel rCTRL.

Upon receiving the downlink control channel fCTRL in the forward subframe, the terminal may detect an assignment for the downlink packet fDLP. However, upon receiving the downlink control channel rCTRL in the reverse subframe, the terminal may not be able to determine whether an assignment for the downlink packet rDLP or an assignment for the downlink packet aDLP is included. Accordingly, in one embodiment, a bit for identifying the assignment for the downlink packet rDLP or the assignment for the downlink packet aDLP may be added to the downlink control channel rCTRL. This bit may have one bit and may indicate to the terminal whether to additionally receive the downlink packet in the following forward subframe. In one embodiment, this bit may be added to a DCI of the downlink control channel rCTRL.

In some embodiments, the downlink time duration rDwPTS of the reverse subframe may be defined by a small number of downlink symbols as shown in FIG. 39. In this case, only the downlink control channel fCTRL of the forward subframe may be defined without defining a downlink control channel of the reverse subframe. Therefore, the downlink control channel fCTRL may include a downlink assignment for the downlink packet rDLP.

In some embodiments, the downlink control channel fCTRL may include start symbol information of the downlink packet as the downlink assignment, and the start symbol information may indicate a type of the downlink packet. For example, if the start symbol information of the downlink packet indicates the downlink time duration fDwPTS of the forward subframe, the terminal can recognize that the downlink packet is a downlink packet fDLP transmitted in the forward subframe. When the start symbol information of the downlink packet indicates the downlink time duration rDwPTS of the reverse subframe, the terminal may recognize that the downlink pack is a downlink packet aDLP transmitted in the aggregated subframe or a downlink packet rDLP transmitted in the reverse subframe.

In one embodiment, when both the downlink packets aDLP and rDLP are defined, the downlink control channel fCTRL may allocate end symbol information of the downlink packet as the downlink assignment to distinguish the downlink packets aDLP and rDLP. When the downlink control channel fCTRL includes the end symbol information of the downlink packet, the terminal can recognize that the downlink packet is a downlink packet rDLP transmitted in the reverse subframe. In another embodiment, the downlink packet may be a downlink packet rDLP if the end symbol information indicates the downlink time duration rDwPTS of the reverse subframe, and the downlink packet may be a downlink packet aDLP if the end symbol information indicates the downlink time duration fDwPTS of the following forward subframe.

In one embodiment, a DCI of the downlink control channel fCTRL may be used to indicate the start symbol information and the end symbol information.

In some embodiments, the downlink control channel fCTRL may include a type of the downlink packet as the downlink assignment instead of including the start symbol information and the end symbol information. Therefore, when the type of the downlink packet indicates the downlink packet (fDLP) in the downlink control channel fCTRL, the terminal can receive the downlink packet only in the downlink time duration fDwPTS of the forward subframe. When the type of the downlink packet indicates the downlink packet rDLP, the terminal can receive the downlink packet only in the downlink time slot rDwPTS of the reverse subframe. When the type of the downlink packet indicates the downlink packet a DLP, the terminal can receive the downlink packet in the downlink time durations rDwPTS and fDwPTS of the reverse subframe and the subsequent forward subframe.

In one embodiment, the downlink control channel fCTRL may use two bits to indicate the type of downlink packet.

A reference signal resource may be defined to allocate a downlink packet to a downlink time duration rDwPTS of a reverse subframe. A cell-specific reference signal CRS may be always transmitted in a downlink time duration, but a demodulation reference signal DMRS may be transmitted only when a downlink packet is transmitted.

Therefore, in some embodiments, if the DMRS is allocated to a downlink time duration fDwPTS of a forward subframe in a case where the downlink control channel fCTRL allocates a downlink packet aDLP, the DMRS transmitted in the forward subframe may be used instead of allocating an additional DMRS to the downlink time duration rDwPTS of the reverse subframe.

Next, an uplink transmission method using an aggregated subframe formed in order of a forward subframe and a reverse subframe is described with reference to FIG. 40 and FIG. 41.

Figure 40:
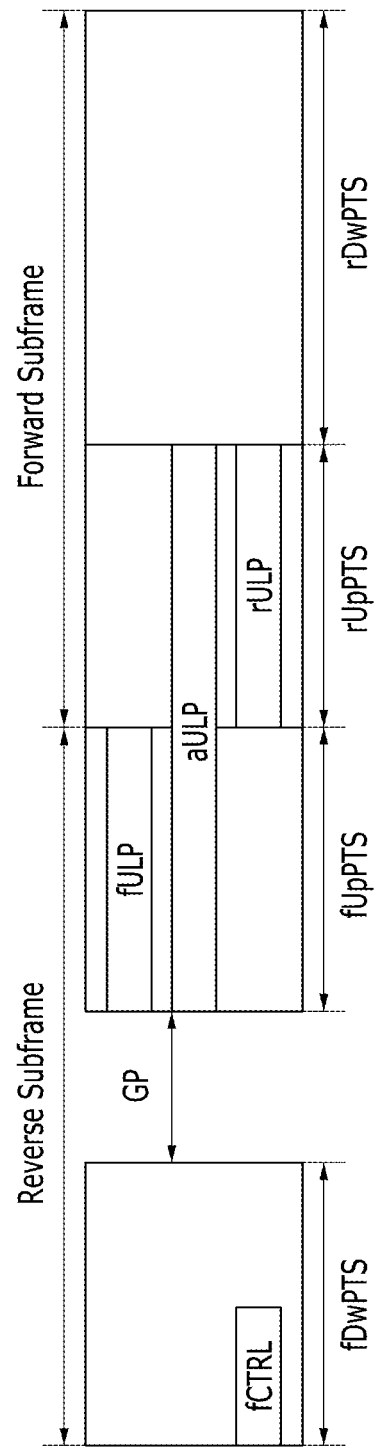
FIG. 40 and FIG. 41 each show an uplink transmission method using an aggregated subframe in a wireless communication system according to another embodiment of the present invention.
Figure 41:
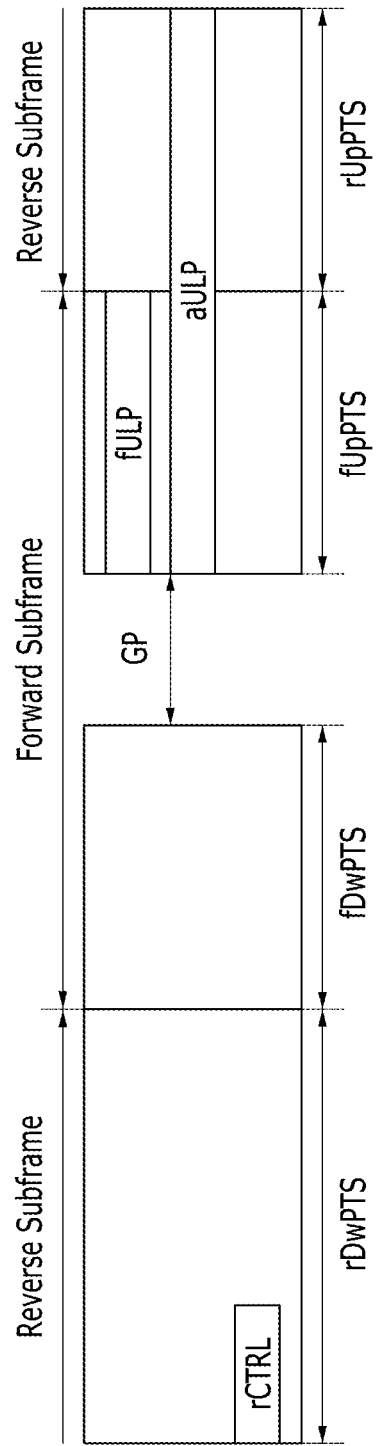

FIG. 40 and FIG. 41 each show an uplink transmission method using an aggregated subframe in a wireless communication system according to another embodiment of the present invention.

An uplink grant may be determined differently depending on processing latency of a terminal. If the terminal encodes an uplink packet using k subframe(s) and if a downlink control channel is received at subframe (subframe n), a timing of an uplink grant included in a downlink control channel fCTRL may be different from a timing of an uplink grant included in a downlink control channel rCTRL. For example, Table 1 shows uplink grant timings in a case where uplink transmission is possible in a subframe where the uplink grant is received (a case where "k<1" is allowed) and a case where uplink transmission is possible in a subframe following a subframe where the uplink grant is received (a case of k=1).

TABLE 1

| | uplink grant timing (subframe n) | uplink packet starting timing (subframe m) |
|---|---|---|
| k < 1 | fCTRL(n) | fULP(n) or aULP(n) rULP(n + 1) |
| k = 1 | rCTRL(n − 1) fCTRL(n) | fULP(n) or aULP(n) rULP(n + 1) |

Referring to FIG. 40 and Table 1, the uplink grant may be transmitted via a downlink control channel fCTRL of a forward subframe. If k is less than one, the downlink control channel fCTRL may indicate either an uplink packet fULP transmitted in an uplink time duration fUpPTS of the same subframe or an uplink packet aULP transmitted in uplink time durations fUpPTS and rUpPTS of the same subframe and a subsequent reverse subframe. In one embodiment, the downlink control channel fCTRL may further include information for identifying either the uplink packet fULP or the uplink packet aULP. This information may have one bit and be added to a DCI. Alternatively, the downlink control channel fCTRL may indicate an uplink packet rULP transmitted in the uplink time durations rUpPTS of the subsequent reverse subframe.

If k is one, the downlink control channel fCTRL may indicate an uplink packet rULP transmitted in an uplink time duration rUpPTS of a next subframe, i.e., a reverse subframe.

Referring to FIG. 41 and Table 1, the uplink grant may be transmitted via a downlink control channel rCTRL of the reverse subframe. In the reverse subframe, since uplink transmission cannot be performed after the downlink control channel rCTRL is received, k<1 is not allowed. Therefore, the downlink control channel rCTRL may indicate either an uplink packet fULP transmitted in an uplink time duration fUpPTS of a next subframe, i.e., a forward subframe or an uplink packet aULP transmitted in uplink time durations fUpPTS and rUpPTS of the forward subframe and a subsequent reverse subframe, i.e., an aggregated subframe. In one embodiment, the downlink control channel rCTRL may further include information for identifying either the uplink packet fULP or the uplink packet aULP. This information may have one bit and be added to the DCI.

As shown in FIG. 40 and FIG. 41, since one transport block is allocated to two uplink time durations fUpPTS and rUpPTS for the uplink packet aULP transmitted in the aggregation subframe, a larger transport block can be used. Then, the base station can support higher uplink throughput to the terminal with low mobility. In a case where a terminal is located at a cell edge, the base station may allocate a narrow uplink bandwidth to the terminal and indicate a higher transmission power in order to acquire more uplink coverage.

However, since the two uplink time durations fUpPTS and rUpPTS forming the uplink packet aULP may have different interference conditions, the optimal MCS and precoding may be different for the uplink time durations. In this case, the base station may decode the transport block while receiving the uplink packet aULP, assuming that the MCS is the same for the two subframes but the precoding may be different for the two subframes.

Next, a transmission method of an uplink HARQ feedback for a downlink packet using an aggregate subframe in a wireless communication system according to another embodiment of the present invention is described with reference to FIG. 42 to FIG. 45.

FIG. 42, FIG. 43, FIG. 44 and FIG. 45 each show a method of transmitting an uplink HARQ feedback in a wireless communication system according to another embodiment of the present invention. The uplink HARQ feedback for each transport block may be an uplink HARQ ACK or an uplink HARQ NACK. For convenience, the uplink HARQ feedback is shown as an HARQ ACK in FIG. 42 to FIG. 45.

Figure 42:
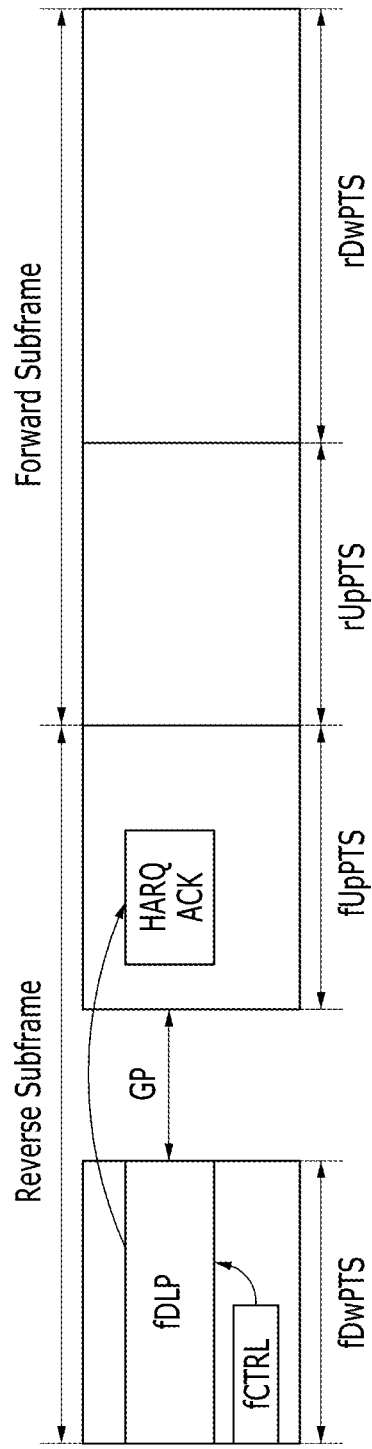
FIG. 42, FIG. 43, FIG. 44 and FIG. 45 each show a method of transmitting an uplink HARQ feedback in a wireless communication system according to another embodiment of the present invention.
Figure 43:
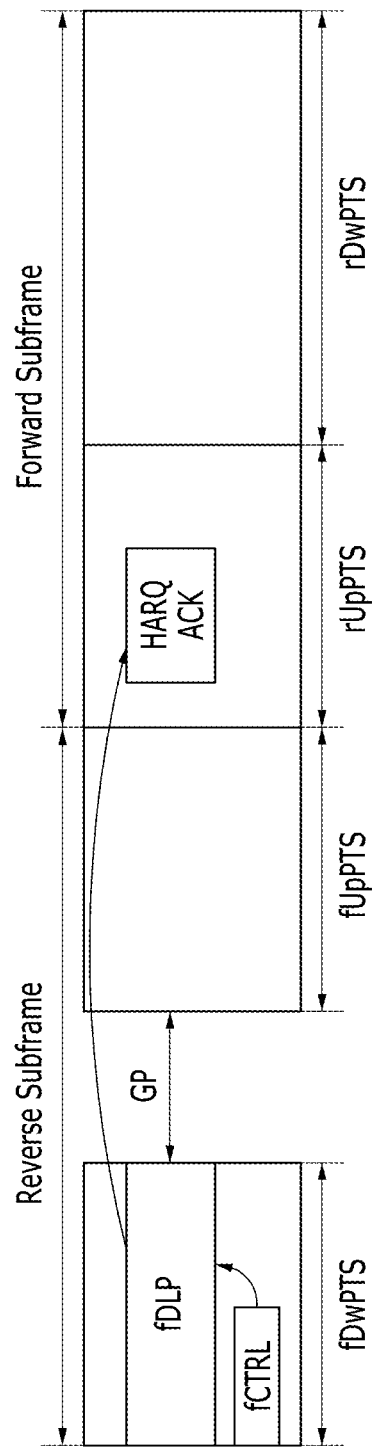

Referring to FIG. 42 and FIG. 43, a base station may transmit a downlink control channel fCTRL including a downlink assignment and a downlink packet fDLP in a downlink time duration fDwPTS of a forward subframe. In this case, when an uplink HARQ feedback timing indicates the same subframe, a terminal may transmit an uplink HARQ feedback for the downlink packet fDLP in an uplink time duration fUpPTS of the same subframe as shown in FIG. 42. When the uplink HARQ feedback timing indicates a next subframe, the terminal may transmit the uplink HARQ feedback for the downlink packet fDLP in an uplink time duration rUpPTS of the next subframe (i.e., a reverse subframe) as shown in FIG. 43.

Figure 44:
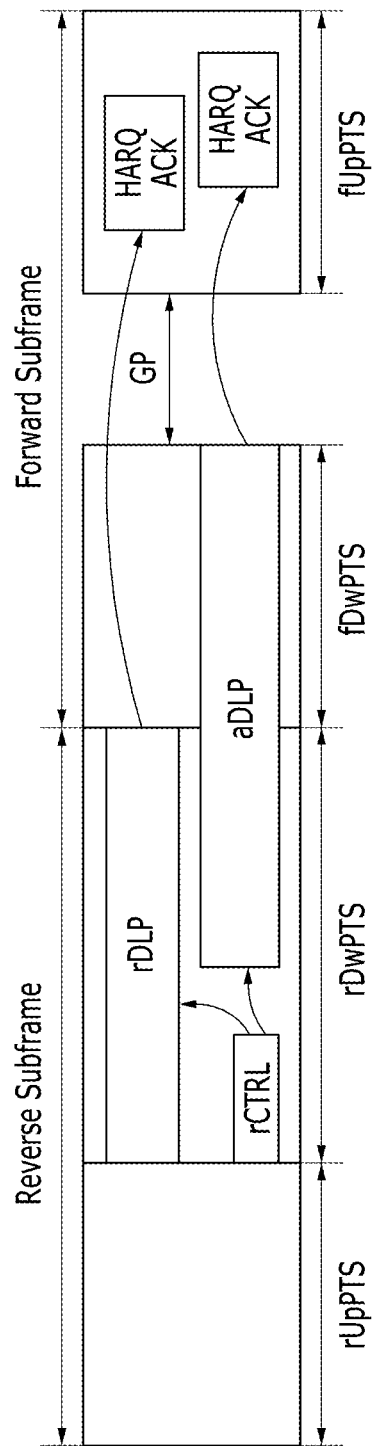
Figure 45:
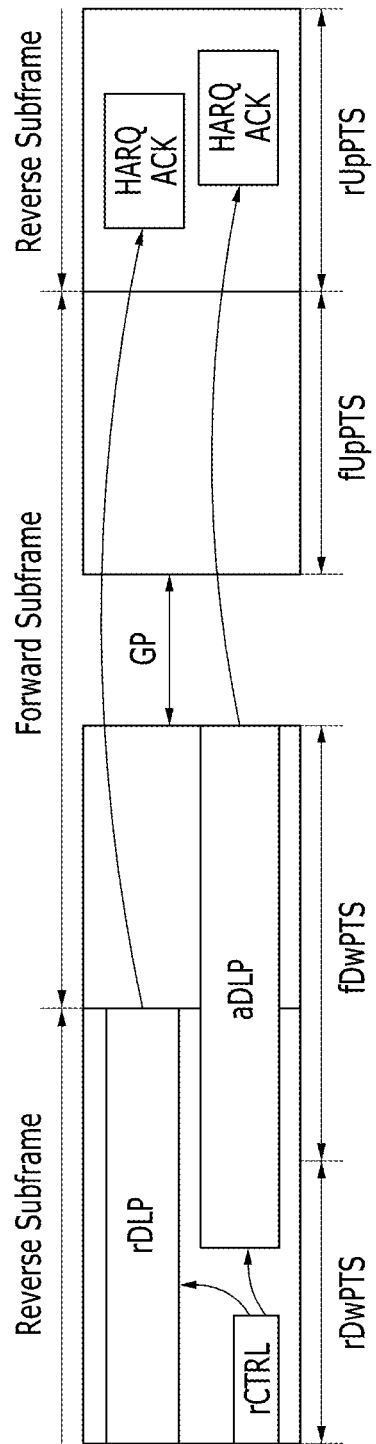

Referring to FIG. 44 and FIG. 45, a base station may transmit a downlink control channel rCTRL including a downlink assignment and a downlink packet in a downlink time duration rDwPTS of a reverse subframe. In this case, a downlink packet rDLP may be transmitted in the downlink time duration rDwPTS of the reverse subframe, or a downlink packet aDLP may be transmitted in the downlink time duration rDwPTS of the reverse subframe and an uplink time duration fDwPTS of the following forward subframe. Since there is no uplink time duration following the downlink time duration rDwPTS of the reverse subframe, an uplink HARQ feedback timing cannot indicate the same subframe. When the uplink HARQ feedback timing indicates a next subframe, a terminal may transmit an uplink HARQ feedback for the downlink packet rDLP or aDLP in an uplink time duration fUpPTS of the next subframe (i.e., the forward subframe) as shown in FIG. 44. When the uplink HARQ feedback timing indicates a second next subframe, the terminal may transmit the uplink HARQ feedback for the downlink packet rDLP (or aDLP) in an uplink time duration rUpPTS of the second next subframe (i.e., a next reverse subframe) as shown in FIG. 45.

In one embodiment, the base station may indicate the uplink HARQ feedback timing through a higher layer signalling. In another embodiment, the base station may inform the terminal of the uplink HARQ feedback timing via a dynamic signaling. In yet another embodiment, the base station may implicitly indicate the uplink HARQ feedback timing to the terminal by selecting a DCI format.

Next, a method of transmitting a sounding reference signal in a wireless communication system according to another embodiment of the present invention is described with reference to FIG. 46.

Figure 46:
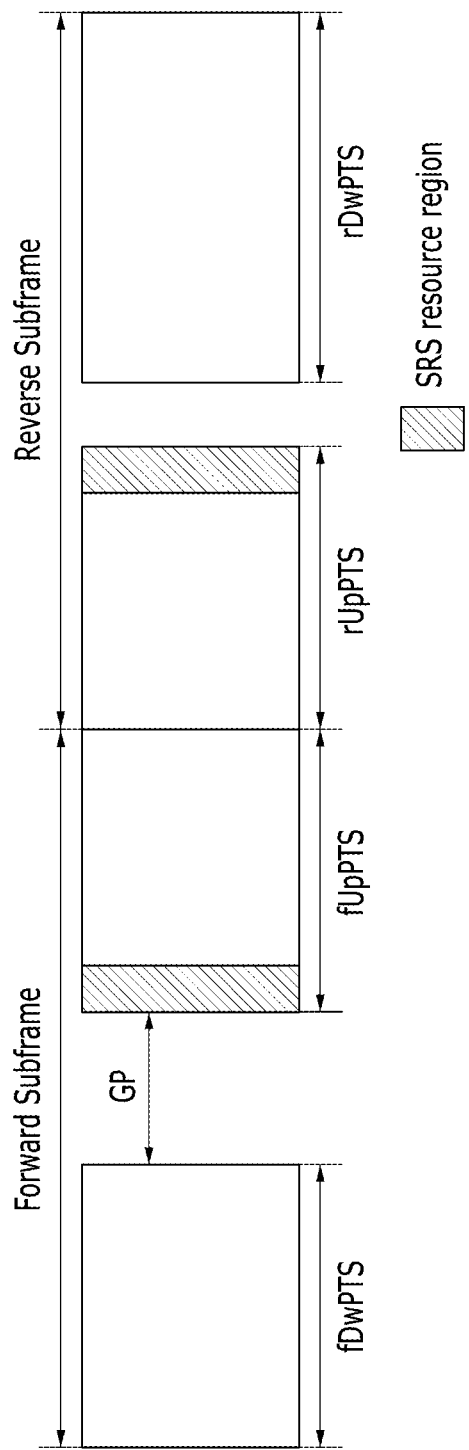
FIG. 46 shows a method of transmitting a sounding reference signal in a wireless communication system according to another embodiment of the present invention.

FIG. 46 shows a method of transmitting a sounding reference signal in a wireless communication system according to another embodiment of the present invention.

Referring to FIG. 46, in some embodiments, a resource for a sounding reference signal SRS may be allocated for each uplink time duration UpPTS of an aggregated subframe. A terminal may transmit the sounding reference signal SRS in each uplink time duration for uplink channel estimation, and the base station may estimate an uplink channel based on the sounding reference signal SRS. The base station may configure a periodic sounding reference signal or an aperiodic sounding reference signal to the terminal. In one embodiment, the base station may configure the periodic sounding reference signal or the aperiodic sounding reference signal using a radio resource control (RRC) signalling.

In some embodiments, the terminal may perform rate matching on the uplink packet to reduce interference from the sounding reference signal. In one embodiment, in order to reduce a complexity of the rate matching, the terminal may transmit the sounding reference signal symbol on both or one of the lower symbol index in the forward subframe and the higher symbol index in the reverse subframe as shown in FIG. 46. The base station can allocate the uplink packet to consecutive uplink symbols by avoiding sounding reference signal resources located at the beginning and/or end of the uplink time durations fUpPTS and rUpPTS in the aggregated subframe. Therefore, a decoding probability of the uplink packet in the base station can be increased even in a mobile broadband (MBB) scenario in which a mobility of the terminal is high.

According to embodiments described above, in a wireless communication system using an unpaired spectrum, downlink transmission and uplink transmission can be simultaneously performed in one subframe. Accordingly, a low latency packet can be transmitted and an HARQ feedback can be performed in the same subframe.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting or receiving data by a terminal in a wireless communication system, the method comprising:

receiving first information on a first list of combinations from a base station through a higher layer signaling, each combination indicating a starting symbol and a number of downlink symbol(s) of a downlink data duration;

receiving, from the base station, a physical downlink control channel (PDCCH) including downlink control information (DCI), the DCI including second information which indicates one combination among the first list of combinations, the one combination indicating a starting symbol and a number of downlink symbol(s) of a downlink data duration allocated for the terminal; and receiving a downlink data during the allocated downlink data duration from the base station, the allocated downlink data duration starting at the starting symbol indicated by the second information and lasting for the number of downlink symbol(s) indicated by the second information.

2. The method of claim 1, further comprising receiving third information on a second list of combinations from the base station through a higher layer signaling, each combination indicating a starting symbol and a number of uplink symbol(s) of an uplink data duration.

3. The method of claim 2, wherein the DCI further includes fourth information which indicates one combination among the second list of combinations, the one combination indicating a staring symbol and a number of uplink symbol(s) of an uplink data duration allocated for the terminal.

4. The method of claim 3, further comprising transmitting an uplink data during the allocated uplink data duration to the base station, the allocated uplink data duration starting at the starting symbol indicated by the fourth information and lasting for the number of uplink symbol(s) indicated by the fourth information.

5. A method for transmitting or receiving data by a base station in a wireless communication system, the method comprising:

transmitting first information on a first list of combinations to a terminal through a higher layer signaling, each combination indicating a starting symbol and a number of downlink symbol(s) of a downlink data duration;

transmitting, to the terminal, a physical downlink control channel (PDCCH) including downlink control information (DCI), the DCI including second information which indicates one combination among the first list of combinations, the one combination indicating a starting symbol and a number of downlink symbol(s) of a downlink data duration allocated for the terminal; and transmitting a downlink data during the allocated downlink data duration to the terminal, the allocated downlink data duration starting at the staring symbol indicated by the second information and lasting for the number of downlink symbol(s) indicated by the second information.

6. The method of claim 5, further comprising transmitting third information on a second list of combinations to the terminal through a higher layer signaling, each combination indicating a starting symbol and a number of uplink symbol(s) of an uplink data duration.

7. The method of claim 6, wherein the DCI further includes fourth information which indicates one combination among the second list of combinations, the one combination indicating a staring symbol and a number of uplink symbol(s) of an uplink data duration allocated for the terminal.

8. The method of claim 7, further comprising receiving an uplink data during the allocated uplink data duration from the terminal, the allocated uplink data duration starting at the starting symbol indicated by the fourth information and lasting for the number of uplink symbol(s) indicated by the fourth information.

* * * * *